United States Patent
Seo et al.

(10) Patent No.: US 8,647,726 B2
(45) Date of Patent: Feb. 11, 2014

(54) OPTICAL ELEMENT

(75) Inventors: Eun Mi Seo, Daejeon (KR); Sin Young Kim, Daejeon (KR); Kyun Il Rah, Daejeon (KR); Moon Soo Park, Daejeon (KR); Seung Hun Chae, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/527,320

(22) Filed: Jun. 19, 2012

(65) Prior Publication Data
US 2012/0257129 A1   Oct. 11, 2012

Related U.S. Application Data

(63) Continuation-in-part of application No. PCT/KR2011/008593, filed on Nov. 10, 2011.

(30) Foreign Application Priority Data

| Nov. 10, 2010 | (KR) | 10-2010-0111757 |
| Nov. 10, 2010 | (KR) | 10-2010-0111758 |
| Dec. 7, 2010 | (KR) | 10-2010-0124411 |
| Jun. 15, 2011 | (KR) | 10-2011-0057830 |
| Oct. 26, 2011 | (KR) | 10-2011-0110092 |
| Oct. 26, 2011 | (KR) | 10-2011-0110093 |
| Oct. 26, 2011 | (KR) | 10-2011-0110096 |
| Nov. 10, 2011 | (KR) | 10-2011-0117227 |

(51) Int. Cl.
*C09K 19/04* (2006.01)
*C09K 19/52* (2006.01)
*C09K 19/38* (2006.01)
*C09K 19/54* (2006.01)
*G02B 5/30* (2006.01)
*G02B 27/22* (2006.01)
*G02B 27/26* (2006.01)

(52) U.S. Cl.
USPC ..... 428/1.5; 428/1.1; 252/299.01; 252/299.5; 252/299.67; 349/15; 349/193; 349/194; 359/465

(58) Field of Classification Search
USPC ........... 428/1.1, 1.31, 1.5; 252/299.5, 299.01, 252/299.67; 349/15, 183, 193, 194; 359/465
See application file for complete search history.

(56) References Cited

U.S. PATENT DOCUMENTS

| 2008/0170294 A1* | 7/2008 | Kuroda et al. | 359/500 |
| 2008/0252973 A1* | 10/2008 | Akari et al. | 359/485 |
| 2012/0257128 A1* | 10/2012 | Seo et al. | 349/15 |
| 2012/0262639 A1* | 10/2012 | Kim et al. | 349/15 |
| 2013/0027620 A1* | 1/2013 | Kim et al. | 349/15 |
| 2013/0083262 A1* | 4/2013 | Kim et al. | 349/15 |

* cited by examiner

*Primary Examiner* — Shean C Wu
(74) *Attorney, Agent, or Firm* — McKenna Long & Aldridge, LLP

(57) ABSTRACT

An optical element and a stereoscopic image display device are provided. The optical element is a light-dividing element, for example, an element that can divide incident light into at least two kinds of light having different polarized states. Therefore, the optical element can be used to realize a stereoscopic image.

20 Claims, 7 Drawing Sheets

Fig.3

| A | B | A | B | A | B |
|---|---|---|---|---|---|
| B | A | B | A | B | A |
| A | B | A | B | A | B |
| B | A | B | A | B | A |
| A | B | A | B | A | B |
| B | A | B | A | B | A |

Fig.10

| LG | RG | LG | RG | LG | RG |
|----|----|----|----|----|----|
| RG | LG | RG | LG | RG | LG |
| LG | RG | LG | RG | LG | RG |
| RG | LG | RG | LG | RG | LG |
| LG | RG | LG | RG | LG | RG |
| RG | LG | RG | LG | RG | LG |

OPTICAL ELEMENT

CROSS-REFERENCE TO RELATED APPLICATION

This application is a Continuation-In-Part (Bypass) Application of International Patent Application No. PCT/KR2011/008593, filed on Nov. 10, 2011, which claims priority to and the benefit of Korean Patent Application Nos. 10-2010-0111757, filed on Nov. 10, 2010, 10-2010-0111758, filed on Nov. 10, 2010, 10-2010-0124411, filed on Dec. 7, 2010, 10-2011-0057830, filed on Jun. 15, 2011, 10-2011-0110092, filed on Oct. 26, 2011, 10-2011-0110093, filed on Oct. 26, 2011, 10-2011-0110096, filed on Oct. 26, 2011, and 10-2011-0117227, filed on Nov. 10, 2011, which are all hereby incorporated by reference in their entirety herein.

BACKGROUND

1. Field of the Invention

The present invention relates to an optical element and a stereoscopic image display device.

2. Discussion of Related Art

Techniques of dividing light into at least two kinds of light having different polarized states may be effectively used in various fields.

The light division techniques may be, for example, applied to manufacture of stereoscopic images. The stereoscopic images may be realized using binocular parallax. For example, when two 2-dimensional images are input into the human left and right eyes, respectively, the input information is transmitted and combined in the brain, which makes it possible for a human being to experience 3-dimensional (3D) senses of depth and reality. Therefore, the light division techniques may be used during this procedure.

Techniques of generating a stereoscopic image may be effectively used for 3D measurements, and also used in 3D TV, cameras or computer graphics.

SUMMARY OF THE INVENTION

The present invention is directed to providing an optical element and a stereoscopic image display device.

One aspect of the present invention provides an optical element. The optical element according to one exemplary embodiment may include a polarizer and a liquid crystal layer, and also may include an adhesive layer attaching the polarizer and the liquid crystal layer.

The adhesive layer may include an active energy ray-curable adhesive composition in a cured state, wherein the adhesive composition includes a radically polymerizable compound and a cationically polymerizable compound. In this specification, the term "curing" may refer to a process for the composition to express an adhesive property or pressure-sensitive adhesivity through a physical or chemical action or reaction of a component included in a composition. As such, the term "active energy ray-curable composition" may also refer to a kind of a composition whose curing is induced by irradiation with active energy rays. As such, the "active energy rays" may include particle beams such as alpha-particle beams, proton beams, neutron beams or electron beams, as well as microwaves, infrared rays (IR), ultraviolet rays (UV), X rays and gamma rays. In general, the UV rays or electron beams may be used herein.

A compound containing a hydroxyl group may be used as the radically polymerizable compound. That is, according to one exemplary embodiment, the radically polymerizable compound may be a compound containing both a hydroxyl group and a radically polymerizable functional group. The term "radically polymerizable functional group" may refer to a functional group that can take part in polymerization or a cross-linking reaction using a free radical. Such polymerization or cross-linking reaction may be, for example, induced by irradiation with active energy rays.

Examples of the radically polymerizable compound having a hydroxyl group may include a compound represented by the following Formula 1.

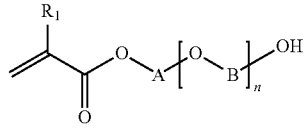

Formula 1

In Formula 1 $R_1$ represents hydrogen or an alkyl group, A and B each independently represent an alkylene group or an alkylidene group, and n is an integer ranging from 0 to 5.

Unless otherwise defined in this specification, the term "alkyl group" may refer to an alkyl group having 1 to 20 carbon atoms, 1 to 16 carbon atoms, 1 to 12 carbon atoms, 1 to 8 carbon atoms or 1 to 4 carbon atoms. The alkyl group may be linear, branched or cyclic, and may be substituted or unsubstituted with one or more substituents.

Unless otherwise defined in this specification, the term "alkylene or alkylidene group" may also be a substituted or unsubstituted alkylene or alkylidene group having 1 to 20 carbon atoms, 1 to 16 carbon atoms, 1 to 12 carbon atoms, 1 to 8 carbon atoms or 1 to 4 carbon atoms.

In this specification, examples of the substituent that may be substituted with a certain functional group may include an alkyl group, an alkoxy group, an alkenyl group, an epoxy group, a cyano group, a carboxyl group, an acryloyl group, a methacryloyl group, an acryloyloxy group, a methacryloyloxy group or an aryl group, but the present invention is not limited thereto.

In Formula 1, n may be more preferably an integer ranging from 0 to 3, and most preferably 0 to 2

Examples of the compound of Formula 1 may include 2-hydroxyethyl(meth)acrylate, 2-hydroxypropyl(meth)acrylate, 4-hydroxybutyl(meth)acrylate, 6-hydroxyhexyl(meth)acrylate, 8-hydroxyoctyl(meth)acrylate, 2-hydroxyethyleneglycol(meth)acrylate or 2-hydroxypropyleneglycol(meth)acrylate, but the present invention is not limited thereto.

Also, the adhesive composition may include a cationically polymerizable compound. Therefore, the adhesive composition may be, for example, an adhesive composition cured by radical and cationic polymerization caused by irradiation with active energy rays.

Examples of the cationically polymerizable compound may include a cationically polymerizable epoxy compound, a vinyl ether compound, an oxetane compound, an oxolane compound, a cyclic acetal compound, a cyclic lactone compound, a thiirane compound, a thiovinylether compound, a spirortho ester compound, an ethylenic unsaturated compound, a cyclic ether compound or a cyclic thioether compound. Preferably, a cationically polymerizable epoxy compound or an oxetane compound may be used herein.

Examples of the cationically polymerizable epoxy compound may include a cresol novolac-type epoxy resin or a phenol novolac-type epoxy resin, and a phenol novolac-type epoxy resin is preferred.

The epoxy resin may have a weight average molecular weight ($M_w$) of 1,000 to 5,000 or 2,000 to 4,000. In this specification, the weight average molecular weight is a value converted from that of a polystyrene standard as measured using gel permeation chromatography (GPC). Unless otherwise defined in this specification, the term "molecular weight" means a "weight average molecular weight." A polymer having a molecular weight of 1,000 or more may be used to properly maintain the durability of an adhesive layer, and a polymer having a molecular weight of 5,000 or less may also be used to maintain the workability such as a coating property of a composition.

Also, examples of the cationically polymerizable epoxy compound may include an alicyclic epoxy compound, an aromatic epoxy compound or an aliphatic epoxy compound, which may be used in combination.

In this specification, the term "alicyclic epoxy compound" may refer to a compound containing at least one alicyclic epoxy group. In this specification, the term "alicyclic epoxy group" refers to a functional group having an aliphatic saturated hydrocarbon ring, wherein two carbon atoms constituting the hydrocarbon ring also constitute an epoxy group.

Examples of the alicyclic epoxy compound may include an epoxycyclohexylmethyl epoxycyclohexanecarboxylate-based compound; an epoxycyclohexane carboxylate-based compound of alkanediol; an epoxy cyclohexylmethyl ester-based compound of dicarboxylic acid; an epoxycyclohexylmethyl ether-based compound of polyethylene glycol; an epoxycyclohexylmethyl ether-based compound of alkanediol; a diepoxytrispiro-based compound; a diepoxymonospiro-based compound; a vinylcyclohexene diepoxide compound; an epoxycyclopentyl ether compound; or a diepoxy tricyclo decane compound. Examples of the compounds may include compounds represented by the following Formulas 2 to 11, respectively.

Formula 2

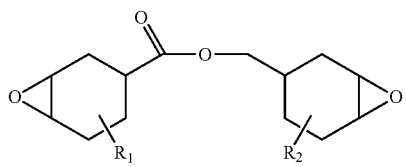

In Formula 2, $R_1$ and $R_2$ independently represent hydrogen or an alkyl group, respectively.

Formula 3

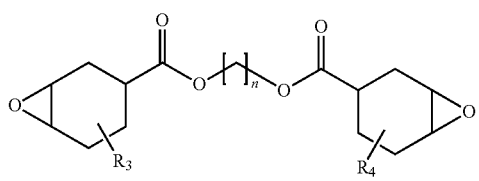

In Formula 3, $R_3$ and $R_4$ independently represent hydrogen or an alkyl group, respectively, and n represents an integer ranging from 2 to 20.

Formula 4

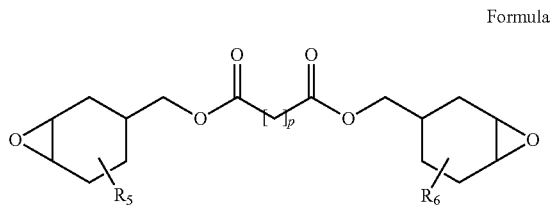

In Formula 4, $R_5$ and $R_6$ independently represent hydrogen or an alkyl group, respectively, and p represents an integer ranging from 2 to 20.

Formula 5

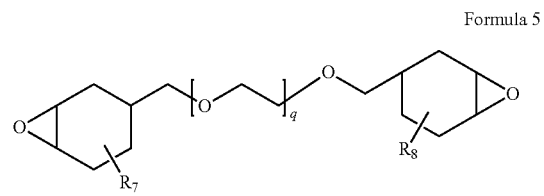

In Formula 5, $R_7$ and $R_8$ independently represent hydrogen or an alkyl group, respectively, and q represents an integer ranging from 2 to 20.

Formula 6

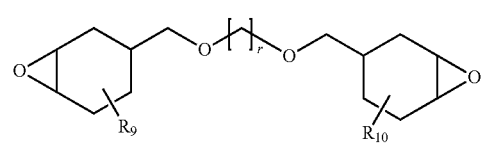

In Formula 6, $R_9$ and $R_{10}$ independently represent hydrogen or an alkyl group, respectively, and r represents an integer ranging from 2 to 20.

Formula 7

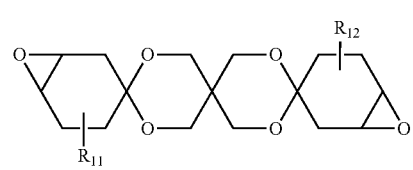

In Formula 7, $R_{11}$ and $R_{12}$ independently represent hydrogen or an alkyl group, respectively.

Formula 8

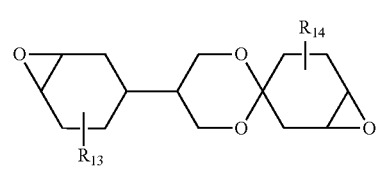

In Formula 8, $R_{13}$ and $R_{14}$ independently represent hydrogen or an alkyl group, respectively.

Formula 9

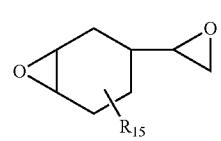

In Formula 9, $R_{15}$ represents hydrogen or an alkyl group.

Formula 10

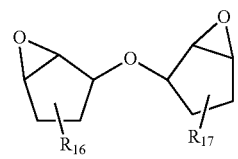

In Formula 10, $R_{16}$ and $R_{17}$ independently represent hydrogen or an alkyl group, respectively.

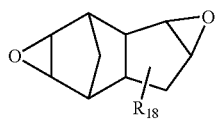

Formula 11

In Formula 11, $R_{18}$ represents hydrogen or an alkyl group.

A difunctional epoxy compound, that is, a compound having two epoxy groups, may be preferably used as the alicyclic epoxy compound, and a compound in which both of the two epoxy groups are alicyclic epoxy groups may be more preferably used, but the present invention is not limited thereto.

The aliphatic epoxy compound may be an epoxy compound having an aliphatic epoxy group rather than the alicyclic epoxy group. For example, examples of the aliphatic epoxy compound may include a polyglycidyl ether of aliphatic polyvalent alcohol; a polyglycidyl ether of an alkyleneoxide addition product of aliphatic polyvalent alcohol; a polyglycidyl ether of polyester polyol of aliphatic polyvalent alcohol and aliphatic polyvalent carboxylic acid; a polyglycidyl ether of aliphatic polyvalent carboxylic acid; a polyglycidyl ether of polyester polycarboxylic acid of aliphatic polyvalent alcohol and aliphatic polyvalent carboxylic acid; a dimer, oligomer or polymer obtained by vinyl polymerization of glycidyl acrylate or glycidyl methacrylate; or an oligomer or polymer obtained by vinyl polymerization of glycidyl acrylate or glycidyl methacrylate; and a vinyl monmer other than the glycidyl acrylate and glycidyl methacrylate. Here, an aliphatic polyvalent alcohol or a polyglycidyl ether of an alkyleneoxide addition product of the aliphatic polyvalent alcohol may be preferably used herein, but the present invention is not limited thereto.

As such, the aliphatic polyvalent alcohol may, for example, be an aliphatic polyvalent alcohol having 2 to 20 carbon atoms, 2 to 16 carbon atoms, 2 to 12 carbon atoms, 2 to 8 carbon atoms or 2 to 4 carbon atoms. For example, examples of the aliphatic polyvalent alcohol may include an aliphatic diol such as ethyleneglycol, 1,2-propanediol, 1,3-propanediol, 2-methyl-1,3-propanediol, 2-butyl-2-ethyl-1,3-propanediol, 1,4-butanediol, neopentylglycol, 3-methyl-2,4-pentanediol, 2,4-pentanediol, 1,5-pentanediol, 3-methyl-1,5-pentanediol, 2-methyl-2,4-pentanediol, 2,4-diethyl-1,5-pentanediol, 1,6-hexanediol, 1,7-heptanediol, 3,5-heptanediol, 1,8-octanediol, 2-methyl-1,8-octanediol, 1,9-nonanediol, or 1,10-decanediol; an alicyclic diol such as cyclohexanedimethana cyclohexanediol, hydrogenated bisphenol A, or hydrogenated bisphenol F; trimethylolethane, trimethylolpropane, a hexitol, a pentitol, glycerin, polyglycerin, pentaerythritol, dipentaerythritol, or tetramethylolpropane.

As such, the alkyleneoxide may also be an alkyleneoxide having 1 to 20 carbon atoms, 1 to 16 carbon atoms, 1 to 12 carbon atoms, 1 to 8 carbon atoms or 1 to 4 carbon atoms. For example, ethyleneoxide, propyleneoxide or butyleneoxide may be used herein.

As such, examples of the aliphatic polyvalent carboxylic acid may also include oxalic acid, malonic acid, succinic acid, glutaric acid, adipic acid, pimelic acid, suberic acid, azelaic acid, sebacic acid, dodecanedioic acid, 2-methylsuccinic acid, 2-methyladipic acid, 3-methyladipic acid, 3-methylpentanedioic acid, 2-methyloctanedioic acid, 3,8-dimethyldecanedioic acid, 3,7-dimethyldecanedioic acid, 1,20-eicosamethylenedicarboxylic acid, 1,2-cyclopentanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, 1,4-dicarboxylic acid methylenecyclohexane, 1,2,3-propanetricarboxylic acid, 1,2,3,4-butanetetracarboxylic acid, or 1,2,3,4-cyclobutanetetracarboxylic acid, but the present invention is not limited thereto.

A compound having no alicyclic epoxy group but containing at least three epoxy groups, preferably three epoxy groups, may be used as the aliphatic epoxy compound since the use of the compound is suitable in consideration of a curing property, weather resistance and refractive index characteristics, but the present invention is not limited thereto.

Examples of the aromatic epoxy compound that may be used herein may include an epoxy compound containing an aromatic group in the molecule, for example, a bisphenol-type epoxy resin such as bisphenol A-based epoxy, bisphenol F-based epoxy, bisphenol S epoxy or brominated bisphenol-based epoxy; a novolac-type epoxy resin such as phenol novolac-type epoxy resin or cresol novolac-type epoxy resin; a cresol epoxy resin or a resorcinol glycidyl ether.

Examples of a cationically polymerizable oxetane compound may include 3-ethyl-3-hydroxymethyl oxetane, 1,4-bis[(3-ethyl-3-oxetanyl)methoxymethyl]benzene, 3-ethyl-3-(phenoxymethyl)oxetane, di[(3-ethyl-3-oxetanyl)methyl] ether, 3-ethyl-3-(2-ethylhexyloxymethyl)oxetane or phenol novolac oxetane. For example, "ARON OXETANE OXT-101," "ARON OXETANE OXT-121," "ARON OXETANE OXT-211," "ARON OXETANE OXT-221" or "ARON OXETANE OXT-212" (commercially available from Toagosei Co., Ltd) may be used as the oxetane compound.

An epoxy compound may be preferably used as the cationically polymerizable compound, and an epoxy resin such as a cresol novolac-type epoxy resin or a phenol novolac-type epoxy resin may be more preferably used.

The adhesive composition may include 10 parts by weight to 60 parts by weight of the radically polymerizable compound and 10 parts by weight to 90 parts by weight of the cationically polymerizable compound, or may include 10 parts by weight to 50 parts by weight of the radically polymerizable compound and 30 parts by weight to 90 parts by weight of the cationically polymerizable compound or 10 parts by weight to 30 parts by weight of the radically polymerizable compound and 30 parts by weight to 90 parts by weight of the cationically polymerizable compound. In this specification, the unit "part(s) by weight" may mean a weight ratio of respective components. A ratio of the components of the adhesive composition may be adjusted to provide an adhesive composition having excellent curing efficiency and improved physical properties after being cured.

Also, the adhesive composition may further include a radically polymerizable oligomer. The term "radical oligomer" may generally refer to a compound in which two or more monomers are polymerized or joined together, which has a radically polymerizable functional group.

The radically polymerizable oligomer is generally referred to as a photoreactive oligomer, and the radically polymerizable oligomer that may be used herein may include urethane acrylate, polyester acrylate, polyether acrylate or epoxy acrylate, and preferably urethane acrylate, but the present invention is not limited thereto.

In the adhesive composition, the radically polymerizable oligomer may be, for example, included in an amount of 1 part by weight to 40 parts by weight, preferably 1 part by weight to 20 parts by weight. The addition effects may be maximized within this weight ratio.

In addition, the adhesive composition may further include a compound represented by the following Formula 12.

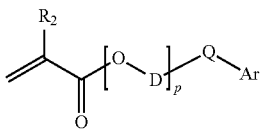

Formula 12

In Formula 12, $R_2$ represents hydrogen or an alkyl group, D represents an alkylene group or an alkylidene group, Q represents a single bond, an oxygen atom or a sulfur atom, Ar represents an aryl group, and p is an integer ranging from 0 to 3.

In Formula 12, the term "single bond" means that no additional atoms are present in a moiety represented by Q. In this case, D and Ar are directly bonded to each other.

Unless otherwise defined in this specification, the term "aryl group" may refer to a monovalent residue derived from a compound or a derivative thereof, which includes a benzene ring or has a structure in which two or more benzene rings are condensed or joined together. The aryl group may be, for example, an aryl group having 6 to 22 carbon atoms, preferably 6 to 16 carbon atoms, and more preferably 6 to 13 carbon atoms, such as a phenyl group, a phenylethyl group, a phenylpropyl group, a benzyl group, a tolyl group, a xylyl group or a naphthyl group.

Also, in Formula 12, p may be preferably 0 or 1.

Examples of the compound of Formula 12 may include phenoxy ethyl (meth)acrylate, benzyl (meth)acrylate, 2-phenylthio-1-ethyl (meth)acrylate, 6-(4,6-dibromo-2-isopropyl phenoxy)-1-hexyl(meth)acrylate, 6-(4,6-dibromo-2-sec-butyl phenoxy)-1-hexyl(meth)acrylate, 2,6-dibromo-4-nonylphenyl(meth)acrylate, 2,6-dibromo-4-dodecyl phenyl (meth)acrylate, 2-(1-naphthyloxy)-1-ethyl (meth)acrylate, 2-(2-naphthyloxy)-1-ethyl (meth)acrylate, 6-(1-naphthyloxy)-1-hexyl(meth)acrylate, 6-(2-naphthyloxy)-1-hexyl (meth)acrylate, 8-(1-naphthyloxy)-1-octyl(meth)acrylate and 8-(2-naphthyloxy)-1-octyl(meth)acrylate. In general, phenoxy ethyl (meth)acrylate, benzyl (meth)acrylate 2-phenylthio-1-ethyl acrylate, 8-(2-naphthyloxy)-1-octyl acrylate and 2-(1-naphthyloxy)-ethyl acrylate, preferably phenoxy ethyl (meth)acrylate and benzyl (meth)acrylate may be used herein, but the present invention is not limited thereto.

In the adhesive composition, the compound of Formula 12 may be, for example, included in an amount of 5 parts by weight to 40 parts by weight or 10 parts by weight to 30 parts by weight. The addition effects may be maximized within this weight ratio.

In addition, the adhesive composition may further include a compound represented by the following Formula 13.

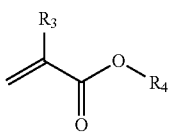

Formula 13

In Formula 13, $R_3$ represents hydrogen or an alkyl group, and $R_4$ represents a monovalent alicyclic hydrocarbon group.

In Formula 13, the monovalent alicyclic hydrocarbon group refers to a compound in which a carbon atom is bonded in a ring shape, for example, a monovalent residue derived from a compound rather than the aromatic compound or a derivative thereof. The alicyclic hydrocarbon group may be an alicyclic hydrocarbon group having 3 to 20 carbon atoms, preferably 5 to 15 carbon atoms, and more preferably 8 to 12 carbon atoms. For example, the alicyclic hydrocarbon group may include an isobornyl group, a cyclohexyl group, a norbornanyl group, a norbornenyl group, a dicyclopentadienyl group, an ethynylcyclohexane group, an ethynylcyclohexene group or an ethynyldecahydronaphthalene group, and an isobornyl group is preferred, but the present invention is not limited thereto.

For example, isobornyl acrylate may be used as the compound of Formula 13, but the present invention is not limited thereto.

In the adhesive composition, the compound of Formula 13 may be, for example, included in an amount of 5 parts by weight to 30 parts by weight or 10 parts by weight to 20 parts by weight. The addition effects may be maximized within this weight ratio.

The adhesive composition may further include a cationic initiator as a component for initiating a curing reaction. For example, a cationic photoinitiator, which releases a component capable of initiating cationic polymerization by irradiation with active energy rays, may be used as the cationic initiator.

The cationic photoinitiator that may be used herein may include an ionized cationic initiator such as onium salt or organometallic salt, or a non-ionized cationic photoinitiator such as organic silane or latent sulfonic acid or other non-ionized compounds. Examples of the onium salt-based initiator may include a diaryliodonium salt, a triarylsulfonium salt or an aryldiazonium salt, examples of the organometallic salt-based initiator may include iron arene, examples of the organic silane-based initiator may include o-nitrobenzyl triaryl silyl ether, triaryl silyl peroxide or acyl silane, and the latent sulfonic acid-based initiator may include α-sulfonyloxy ketone or α-(hydroxymethyl)benzoin sulfonate, but the present invention is not limited thereto. Also, a mixture of the iodine-based initiator and the photosensitizer may be used as the cationic initiator.

The ionized cationic photoinitiator is preferably used as the cationic initiator, the onium salt-based ionized cationic photoinitiator is more preferably used, and the triarylsulfonium salt-based ionized cationic photoinitiator is most preferably used, but the present invention is not limited thereto.

The adhesive composition may include a cationic initiator in an amount of 0.01 parts by weight to 20 parts by weight, 0.01 parts by weight to 10 parts by weight, or 0.01 parts by weight to 5 parts by weight, relative to 100 parts by weight of the cationically polymerizable compound, but this content may be varied in consideration of the curing efficiency.

The adhesive composition may further include a radical initiator. For example, a radical photoinitiator may be used as the radical initiator. For example, a benzoin initiator or an initiator such as a hydroxyketone compound, an aminoketone compound or a phosphine oxide compound may be used as the radical photoinitiator, and a phosphine oxide compound may be preferred. More particularly, examples of the radical photoinitiator may include benzoin, benzoin methylether, benzoin ethylether, benzoin isopropylether, benzoin n-butylether, benzoin isobutylether, acetophenone, dimethylamino acetophenone, 2,2-dimethoxy-2-phenylacetophenone, 2,2-diethoxy-2-phenylacetophenone, 2-hydroxy-2-methyl-1-phenylpropane-1-one, 1-hydroxycyclohexylphenylketone, 2-methyl-1-[4-(methylthio)phenyl]-2-morpholino-propane-1-one, 4-(2-hydroxyethoxy)phenyl-2-(hydroxy-2-propyl)ketone, benzophenone, p-phenylbenzophenone, 4,4'-diethylaminobenzophenone, dichlorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyldimethylketal, acetophenone dimethylketal, p-dimethylamino benzoic acid ester, oligo[2-hydroxy-2-methyl-1-[4-(1-methylvinyl)phenyl]propanone], bis(2,4,6-trimethylbenzoyl)-phenyl-phosphine oxide and 2,4,6-trimethylbenzoyl-diphenyl-phosphine oxide, but the present invention is not limited thereto.

In the adhesive composition, the photoinitiator may be included in an amount of 0.1 parts by weight to 10 parts by weight or 1 part by weight to 5 parts by weight. In this case, the effective polymerization or cross-linking may be induced within this content range, thereby preventing degradation of physical properties caused by a remaining reactive material.

Also, the adhesive composition may further include a photosensitizer. Examples of the photosensitizer may include an anthracene compound, a pyrene compound, a carbonyl compound, an organic sulfur compound, a persulfide, a reduction-oxidation (redox) compound, an azo or diazo compound, a halogen compound or a photoreductive pigment. For example, the photosensitizer may be used in an amount of 20 parts by weight or less, relative to 100 parts by weight of the cationically polymerizable components included in the composition.

Examples of the photosensitizer may include an anthracene compound represented by the following Formula 14; pyrene; a benzoin derivative such as benzoin methyl ether, benzoin isopropyl ether or α,α-dimethoxy-α-phenylacetophenone; a benzophenone derivative such as benzophenone, 2,4-dichlorobenzophenone, o-benzoylbenzoic acid methyl, 4,4'-bis(dimethylamino)benzophenone or 4,4'-bis(diethylamino)benzophenone; a thioxanthone derivative such as 2-chlorothioxanthone or 2-isopropylthioxanthone; an anthraquinone derivative such as 2-chloroanthraquinone or 2-methylanthraquinone; an acridone derivative such as N-methylacridone or N-butylacridone; and optionally α,α-diethoxyacetophenone, benzyl, fluorenone, xanthone, a uranyl compound or a halogen compound.

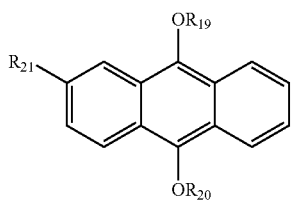

Formula 14

In Formula 14, $R_{19}$ and $R_{20}$ independently represent an alkyl group or an ether group, respectively, and $R_{21}$ represents hydrogen or an alkyl group.

In Formula 14, the alkyl group that may be used for $R_{19}$, $R_{20}$ and $R_{21}$ may include a methyl group, an ethyl group, a propyl group, an isopropyl group, a butyl group, an isobutyl group, an amyl group, an isoamyl group, a hexyl group, a 2-hexyl group, a 3-hexyl group, a cyclohexyl group, a 1-methylcyclohexyl group, a heptyl group, a 2-heptyl group, a 3-heptyl group, an isoheptyl group, an n-octyl group, an isooctyl group, a 2-ethylhexyl group, a nonyl group, an isononyl group, a decyl group, a dodecyl group, a tridecyl group, a tetradecyl group, a pentadecyl group, a hexadecyl group, a heptadecyl group or an octadecyl group.

Also, the ether group that may be used for $R_{19}$ and $R_{20}$ include an ether group having 2 to 18 carbon atoms, for example, a 2-methoxyethyl group, a 2-ethoxyethyl group, a 2-butoxyethyl group, a 2-phenoxyethyl group, a 2-(2-methoxyethoxy)ethyl group, a 3-methoxypropyl group, a 3-butoxypropyl group, a 3-phenoxypropyl group, a 2-methoxy-1-methylethyl group, a 2-methoxy-2-methylethyl group. As seen from the above-described ether group, it is understood that the ether group in Formula 15 refers to a hydrocarbon group having one or more ether bonds and includes an alkoxyalkyl group, an alkoxyalkoxyalkyl group or an aryloxyalkyl group.

A compound in which $R_{19}$ and $R_{20}$ in Formula 14 are alkyl groups having 1 to 4 carbon atoms, and $R_{21}$ represents hydrogen or an alkyl group having 1 to 4 carbon atoms may be preferably used as the photosensitizer.

The photosensitizer may be used at a proper weight ratio in consideration of desired addition effects.

The adhesive layer may be formed by curing the adhesive composition. For example, the adhesive composition may be cured by irradiation with active energy rays so that a polymerization reaction can be initiated. A light source used to irradiate active energy rays is not particularly limited, but a light source capable of irradiating active energy rays having an emission distribution at a wavelength of 400 nm or less is preferred. For example, the light source may include a low-pressure, medium-pressure, high-pressure or ultra high-pressure mercury lamp, a chemical lamp, a black light lamp, a microwave-excited mercury lamp or a metal halide lamp. The irradiation intensity of the active energy rays is determined according to components of the composition, but the present invention is not particularly limited thereto. Here, the irradiation intensity at a wavelength region in which the initiator is effectively activated is preferably in a range of 0.1 mW/cm$^2$ to 6,000 mW/cm$^2$. When the irradiation intensity is 0.1 mW/cm$^2$ or more, a reaction time is not too long, whereas, when the irradiation intensity is 6,000 mW/cm$^2$ or less, it is possible to prevent yellowing or degradation caused by heat radiated from the light source and heat generated during the curing of the composition. The irradiation time is adjusted according to a composition to be cured, but the present invention is not particularly limited thereto. In this case, the irradiation time is preferably set so that an integrated light intensity expressed as the product of the irradiation intensity and the irradiation time can be in a range of 10 mJ/cm$^2$ to 10,000 mJ/cm$^2$. When the integrated light intensity is 10 mJ/cm$^2$ or more, active species derived from the initiator may be maintained at a sufficient amount to securely carry out a curing reaction, whereas, when the integrated light intensity is 10,000 mJ/cm$^2$ or less, the irradiation time is not too long, thereby maintaining good productivity.

The adhesive may have a glass transition temperature of 40° C. or higher, 50° C. or higher, 60° C. or higher, 70° C. or higher, 80° C. or higher, or 90° C. or higher. An optical element having excellent durability may be provided by attaching the polarizer to the liquid crystal layer using the adhesive having the glass transition temperature. Also, the adhesive may serve to stably maintain a phase retardation property of the liquid crystal layer.

In addition, the adhesive may have a thickness of 6 μm or less, 5 μm or less or 4 μm or less. The durability of an adhesive property to the liquid crystal layer and a phase retardation property of the liquid crystal layer, may be suitably maintained within this thickness. As such, a lower limit of the thickness of the adhesive may be, for example, 0.1 μm, 0.3 μm or 0.5 μm.

The optical element includes a polarizer and a liquid crystal layer, which are attached to each other by means of the adhesive layer. FIG. 1 is a schematic diagram of an optical element 1 according to one exemplary embodiment, showing a structure of the optical element 1 in which a polarizer 12, an adhesive layer 11 and a liquid crystal layer 13 are sequentially formed.

The kind of the polarizer included in the optical element is not particularly limited. For example, the kind of a conventional polarizer such a polyvinyl alcohol polarizer, which is uniaxially or biaxially elongated and to which an iodine or dichroic dye is adsorbed and aligned, may be used as the polarizer. Examples of the polyvinyl alcohol resin of the polarizer may include a gelled polyvinylacetate resin. A homopolymer of vinyl acetate or copolymer of an vinyl acetate and another comonomer may be used as the polyvinylacetate resin. Examples of the another comonomer may include an unsaturated carboxylic acid, an olefin, a vinylether, an unsaturated sulfonic acid and an acrylamide having an ammonium group. A gelling degree of the polyvinyl alcohol resin may be generally in a range of 85 mol % to 100 mol %, preferably 98 mol % or more. The polyvinyl alcohol resin may be further modified. For example, aldehyde-modified polyvinyl formal or polyvinylacetal may be used herein.

The liquid crystal layer may have a difference between in-plane refractive indexes in a slow axis direction and in-plane refractive indexes in a fast axis direction of 0.05 to 0.2, 0.07 to 0.2, 0.09 to 0.2 or 0.1 to 0.2. As such, the in-plane refractive index in the slow axis direction may refer to a refractive index in a direction in which the maximum value of the refractive index is defined with respect to the plane of the liquid crystal layer, and the in-plane refractive index in the fast axis direction may refer to a refractive index in a direction in which the minimum value of the refractive index is defined with respect to the plane of the liquid crystal layer. In general, the fast axis and slow axis in an optically anisotropic liquid crystal layer are formed vertically to each other. The refractive indexes may be measured with respect to light at a wavelength of 550 nm or 589 nm.

The liquid crystal layer may also have a thickness of approximately 0.5 μm to 2.0 μm or approximately 0.5 μm to 1.5 μm.

The liquid crystal layer satisfying the relationship of the refractive indexes and having the thickness may express a phase retardation property suitable for use in applications. According to one exemplary embodiment, the liquid crystal layer satisfying the relationship of the refractive indexes and having the thickness may be suitable for use in an optical element for optical division.

In addition, the liquid crystal layer may satisfy the conditions of the following Equation 1.

$$X<8\% \quad \text{Equation 1}$$

In Equation 1, X represents a percentage of the absolute value of a variation in a phase difference value of the liquid crystal layer obtained when the optical element is kept at 80° C. for 100 hours or 250 hours, relative to the initial phase difference value of the liquid crystal layer of the optical element.

For example, X may be calculated as follows: $100\times(|R_0-R_1|)/R_0$. Here, $R_0$ is an initial phase difference value of the liquid crystal layer of the optical element, and $R_1$ represents a phase difference value of the liquid crystal layer obtained when the optical element is kept at 80° C. for 100 hours or 250 hours.

X may be preferably 7% or less, 6% or less or 5% or less. A variation of the phase difference value may be measured using a method presented in the following Examples.

A liquid crystal layer satisfying the above-described conditions may be, for example, embodied using the liquid crystal layer having the following compositions.

The liquid crystal layer may include a multifunctional polymerizable liquid crystal compound and a monofunctional polymerizable liquid crystal compound in polymerized forms.

In this specification, the term "multifunctional polymerizable liquid crystal compound" may refer to a compound that shows a liquid crystalline property because it includes a mesogen backbone, and also having two or more polymerizable functional groups. According to one exemplary embodiment, the multifunctional polymerizable liquid crystal compound may contain 2 to 10, 2 to 8, 2 to 6, 2 to 5, 2 to 4, 2 to 3, or 2 polymerizable functional groups.

In this specification, the term "monofunctional polymerizable liquid crystal compound" may also refer to a compound that shows a liquid crystalline property because it includes a mesogen backbone, and also having one polymerizable functional group.

Also, in this specification, the expression "a polymerizable liquid crystal compound being included in a liquid crystal layer in a polymerized form" may refer to a state in which the liquid crystal compound is polymerized to form a liquid crystal polymer in the liquid crystal layer.

When the liquid crystal layer includes the multifunctional and monofunctional polymerizable compounds in polymerized forms, the liquid crystal layer may have more excellent phase retardation properties, and the realized phase retardation properties, for example, the optical axis and a phase retardation value of the liquid crystal layer, may be stably maintained under the severe conditions.

According to one exemplary embodiment, the polymerizable liquid crystal compound may be a compound represented by the following Formula 15.

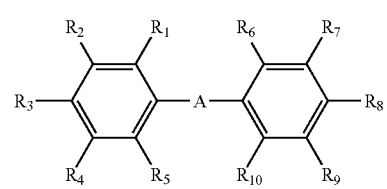

Formula 15

In Formula 15, A is a single bond, —COO— or —OCO—, and $R_1$ to $R_{10}$ are independently hydrogen, a halogen, an alkyl group, an alkoxy group, an alkoxycarbonyl group, a cyano group, a nitro group, —O-Q-P or a substituent of the following Formula 16, respectively, provided that at least one of the substituents $R_1$ to $R_{10}$ is —O-Q-P or a substituent of the following Formula 16, or two adjacent substituents of $R_1$ to $R_5$ or two adjacent substituents of $R_6$ to $R_{10}$ are joined together to form a benzene ring substituted with —O-Q-P, wherein Q is an alkylene group or an alkylidene group, and P is a polymerizable functional group such as an alkenyl group, an epoxy group, a cyano group, a carboxyl group, an acryloyl group, a methacryloyl group, an acryloyloxy group or a methacryloyloxy group.

Formula 16

In Formula 16, B is a single bond, —COO— or —OCO—, and $R_{11}$ to $R_{15}$ are independently hydrogen, a halogen, an alkyl group, an alkoxy group, an alkoxycarbonyl group, a cyano group, a nitro group or —O-Q-P, respectively, provided that at least one of substituents $R_{11}$ to $R_{15}$ is —O-Q-P, or two adjacent substituents of $R_{11}$ to $R_{15}$ are joined together to form a benzene ring substituted with —O-Q-P, wherein Q is an alkylene group or an alkylidene group, and P is a polymerizable functional group such as an alkenyl group, an epoxy group, a cyano group, a carboxyl group, an acryloyl group, a methacryloyl group, an acryloyloxy group or a methacryloyloxy group.

In Formulas 15 and 16, the expression "two adjacent substituents are joined together to form a benzene ring substituted with —O-Q-P" may mean that the two adjacent substituents are joined together to form a naphthalene backbone substituted with —O-Q-P as a whole.

In Formula 16, "—" indicated on the left side of B may mean that B is directly bonded to the benzene ring of Formula 15.

In Formulas 15 and 16, the term "single bond" means that no additional atoms are present in a moiety represented by A or B. For example, when A in Formula 15 is a single bond, the benzene rings disposed on both sides of A may be directly bonded to form a biphenyl structure.

In Formulas 15 and 16, the halogen may be chlorine, bromine or iodine.

Unless otherwise defined in this specification, the term "alkyl group" may refer to a linear or branched alkyl group having 1 to 20 carbon atoms, 1 to 16 carbon atoms, 1 to 12 carbon atoms, 1 to 8 carbon atoms or 1 to 4 carbon atoms, or a cycloalkyl group having 3 to 20 carbon atoms, 3 to 16 carbon atoms or 4 to 12 carbon atoms. The alkyl group may be optionally substituted with one or more substituents.

Unless otherwise defined in this specification, the term "alkoxy group" may refer to an alkoxy group having 1 to 20 carbon atoms, 1 to 16 carbon atoms, 1 to 12 carbon atoms, 1 to 8 carbon atoms or 1 to 4 carbon atoms. The alkoxy group may be linear, branched or cyclic. Also, the alkoxy group may be optionally substituted with one or more substituents.

Also, unless otherwise defined in this specification, the term "alkylene group or alkylidene group" may refer to an alkylene group or alkylidene group having 1 to 12 carbon atoms, 4 to 10 carbon atoms or 6 to 9 carbon atoms. The alkylene group or alkylidene group may be linear, branched or cyclic. Also, the alkylene group or alkylidene group may be optionally substituted with one or more substituents.

Also, unless otherwise defined in this specification, the term "alkenyl group" may refer to an alkenyl group having 2 to 20 carbon atoms, 2 to 16 carbon atoms, 2 to 12 carbon atoms, 2 to 8 carbon atoms or 2 to 4 carbon atoms. The alkenyl group may be linear, branched or cyclic. Also, the alkenyl group may be optionally substituted with one or more substituents.

Also, in Formulas 15 and 16, P may be preferably an acryloyl group, a methacryloyl group, an acryloyloxy group or a methacryloyloxy group, more preferably an acryloyloxy group or a methacryloyloxy group, and most preferably an acryloyloxy group.

In this specification, the substituent which may be substituted with a certain functional group may be an alkyl group, an alkoxy group, an alkenyl group, an epoxy group, an oxo group, an oxetanyl group, a thiol group, a cyano group, a carboxyl group, an acryloyl group, a methacryloyl group, an acryloyloxy group, a methacryloyloxy group or an aryl group, but the present invention is not limited thereto.

The —O-Q-P which may be present in plural numbers in Formulas 15 and 16 or the residue of Formula 16 may be, for example, present in a position of $R_3$, $R_8$ or $R_{13}$. Preferably, $R_3$ and $R_4$, or $R_{12}$ and $R_{13}$ may be joined together to form a benzene ring substituted with —O-Q-P. Also, in the compound of Formula 15 or the residue of Formula 16, the substituent except for the —O-Q-P or the residue of Formula 16, or the substituent except for those being joined together to form the benzene ring may be, for example, hydrogen, a halogen, a linear or branched alkyl group having 1 to 4 carbon atoms, an alkoxycarbonyl group containing a linear or branched alkoxy group having 1 to 4 carbon atoms, a cycloalkyl group having 4 to 12 carbon atoms, a cyano group, an alkoxy group having 1 to 4 carbon atoms, or a nitro group, and preferably chlorine, a linear or branched alkyl group having 1 to 4 carbon atoms, a cycloalkyl group having 4 to 12 carbon atoms, an alkoxy group having 1 to 4 carbon atoms, an alkoxycarbonyl group containing a linear or branched alkoxy group having 1 to 4 carbon atoms, or a cyano group.

The liquid crystal layer may include the monofunctional polymerizable liquid crystal compound in an amount of greater than 0 parts by weight and less than 100 parts by weight, 1 part by weight to 90 parts by weight, 1 part by weight to 80 parts by weight, 1 part by weight to 70 parts by weight, 1 part by weight to 60 parts by weight, 1 part by weight to 50 parts by weight, 1 part by weight to 30 parts by weight or 1 part by weight to 20 parts by weight, relative to 100 parts by weight of the multifunctional polymerizable liquid crystal compound.

The mixing effect of the multifunctional and monofunctional polymerizable liquid crystal compounds may be maximized within this content range. Also, the liquid crystal layer may exhibit an excellent adhesive property to the adhesive layer. Unless otherwise defined in this specification, the term "unit part by weight" may mean a weight ratio.

The multifunctional and monofunctional polymerizable liquid crystal compound may be polymerized in a horizontally aligned state. In this specification, the term "horizontal alignment" may mean that the optical axis of a liquid crystal layer including a polymerized liquid crystal compound has an inclination angle of approximately 0° to approximately 25°, approximately 0° to approximately 15°, approximately 0° to approximately 10°, approximately 0° to approximately 5°, or approximately 0° with respect to a plane of the liquid crystal layer. In this specification, the term "optical axis" may refer to a fast axis or slow axis formed when incident light penetrates through a corresponding region.

According to one exemplary embodiment, the optical element may be an element that divides incident light into two or more kinds of light having different polarized states. Such an element may be, for example, used to realize a stereoscopic image.

For this purpose, the liquid crystal layer may include, for example, first and second regions having different phase retardation properties. In this specification, the fact that the first and second regions have the different phase retardation properties may include a case in which the first and second regions have optical axes formed in the same or different directions and also have different phase retardation values in a state where both the first and second regions have the phase retardation properties, and a case in which the first and second regions have optical axes formed in different directions while having the same phase retardation value. According to another exemplary embodiment, the fact that the first and second regions have the different phase retardation properties may include a case in which one of the first and second regions has a phase retardation property, and the other region is an optically isotropic region having no phase retardation property. In this case, for example, the liquid crystal layer may be formed so that it can include both of a region including a liquid crystal layer and a region free of the liquid crystal layer. The phase retardation property of the first or second region may be regulated, for example, by controlling an alignment state of the liquid crystal compound, the refractive index relationship of the liquid crystal layer or a thickness of the liquid crystal layer.

According to one exemplary embodiment, the first region A and the second region B may be formed in stripe shapes extending to the same direction and alternately arranged adjacent to each other, as shown in FIG. 2, or they may be formed in a lattice pattern and alternately arranged adjacent to each other, as shown in FIG. 3.

When the optical element is used to display a stereoscopic image, one of the first and second regions may refer to a region configured to control polarization of an image signal for the left eye (hereinafter referred to as "LC region"), and the other region may refer to a region configured to control polarization of an image signal for the right eye (hereinafter referred to as "RC region").

According to one exemplary embodiment, the two or more kinds of light having the different polarized states, which are divided by the liquid crystal layer including the first and second regions, may include two kinds of linearly polarized light having vertical directions substantially to each other, or include left-circularly polarized light and right-circularly polarized light.

Unless otherwise defined in this specification, when terms such as vertical, horizontal, perpendicular or parallel are used in definitions of angles, the terms refer to an angle being substantially vertical, horizontal, perpendicular or parallel. For example, the terms include errors in consideration of manufacturing errors or variations. Therefore, the terms may, for example, include an error of not more than approximately ±15°, preferably an error of not more than approximately ±10°, and most preferably an error of not more than approximately ±5°.

According to one exemplary embodiment, one of the first and second regions may be a region through which incident light penetrates without rotating the polarization axis of the incident light, and the other region may be a region through which incident light penetrates while the polarization axis of the incident light is rotated in a direction perpendicular to the polarization axis of the incident light which penetrates through the one of the first and second regions. In this case, the regions of the liquid crystal layer including the polymerizable liquid crystal compound in a polymerized form may be formed on only one of the first and second regions. As such, the regions in which the liquid crystal layer is not formed may be empty, or may be a region in which a glass or optically isotropic resin layer, resin film or sheet is formed.

According to another exemplary embodiment, one of the first and second regions may be a region through which incident light can penetrate when the incident light is converted into left-circularly polarized light, and the other region may be a region through which incident light can penetrate when the incident light is converted into right-circularly polarized light. In this case, the first and second regions have optical axes formed in different directions while having the same phase retardation value, or one of the first and second regions may be a region in which incident light may be phase-retarded by ¼ of a wavelength of the incident light, and the other region may be a region in which incident light may be phase-retarded by ¾ of a wavelength of the incident light.

According to one exemplary embodiment, the first and second regions may have the same phase retardation value, for example, a value required to phase-retard incident light by ¼ of the wavelength of the incident light, and also have optical axes formed in different directions. As such, the optical axes formed in the different directions may be, for example, at right angles.

When the first and second regions have the optical axes formed in different directions, a line bisecting an angle formed between the optical axes of the first and the second regions is preferably formed so that the line can be vertical or horizontal with respect to the absorption axis of the polarizer.

FIG. 4 is a schematic diagram explaining the arrangement of the optical axes of the first and second regions when the first and second regions A and B shown in FIG. 2 or 3 have optical axes formed in different directions. Referring to FIG. 4, a line bisecting an angle formed between the optical axes of the first and second regions A and B may refer to a line bisecting an angle of ($\Theta 1+\Theta 2$). For example, when $\Theta 1$ and $\Theta 2$ are the same angle, the angle-bisecting line may be formed in a direction horizontal with respect to a boundary line L between the first and second regions A and B. As such, an angle, namely ($\Theta 1+\Theta 2$), formed between the optical axes of the first and second regions A and B may also be, for example, 90°.

The optical element may further include a base layer formed on the liquid crystal layer in a position opposite to the adhesive layer. The base layer may be a base layer formed on a liquid crystal layer. The base layer may have a single-layer or multilayer structure. When the optical element further includes the base layer, the liquid crystal layer may be attached to the polarizer by means of the adhesive. FIG. 5 is a schematic diagram showing an optical element 5 further including a base layer 51.

For example, a glass base layer or a plastic base layer may be used as the base layer. Examples of the plastic base layer may include a sheet or film including a cellulose resin such as triacetyl cellulose (TAC) or diacetyl cellulose (DAC); a cyclo olefin polymer (COP) such as a norbornene derivative; an acryl resin such as poly(methyl methacrylate) (PMMA); polycarbonate (PC); a polyolefin such as polyethylene (PE) or polypropylene (PP); PVA; poly ether sulfone (PES); polyetheretherketone (PEEK); polyetherimide (PEI); polyethylene naphthalate (PEN); a polyester such as polyethylene terepthalate (PET); polyimide (PI); polysulfone (PSF); or a fluorine resin.

The base layer, for example, the plastic base layer, may have a lower refractive index than the liquid crystal layer. The refractive index of the base layer according to one exemplary embodiment is in a range of approximately 1.33 to approximately 1.53. When the base layer has a lower refractive index than the liquid crystal layer, it is, for example, profitable that it enhances brightness, prevents reflection and improves contrast characteristics.

The plastic base layer may be optically isotropic or anisotropic. As such, when the base layer is optically anisotropic, the optical axis of the base layer is preferably arranged so that the optical axis of the base layer can be vertical or horizontal with respect to the above-mentioned line bisecting an angle formed between the optical axes of the first region and the second region.

According to one exemplary embodiment, the base layer may include a UV protector or a UV ray absorbent. When the base layer includes the UV protector or absorbent, it is possible to prevent degradation of the liquid crystal layer caused by UV rays. Examples of the UV protector or absorbent may include an organic matter such as a salicylic acid ester compound, a benzophenone compound, an oxybenzophenone compound, a benzotriazol compound, a cyanoacrylate compound or a benzoate compound, or an inorganic matter such as zinc oxide or a nickel complex salt. The content of the UV protector or absorbent in the base layer is not particularly limited, and may be properly selected in consideration of desired effects. For example, in the manufacture of the plastic base layer, the UV protector or absorbent may be included in an amount of approximately 0.1% by weight to 25% by weight, relative to the weight ratio of the main material of the base layer.

A thickness of the base layer is not particularly limited, and may be properly regulated according to a desired purpose of use. The base layer may have a single-layer or multilayer structure.

The optical element according to one exemplary embodiment may further include an alignment layer disposed between the base layer and the liquid crystal layer. The alignment layer may serve to align a liquid crystal compound during formation of the optical element. As the alignment layer, a conventional alignment layer known in the art, for example, an optical alignment layer or a rubbing alignment layer, may be used. The alignment layer has a certain configuration, and may optionally have an alignment property without using an alignment layer by directly rubbing or elongating the base layer.

Also, the optical element may further include a protection layer attached to an upper portion of the polarizer. FIG. 6 is a schematic diagram showing an optical element 6 further including a protection layer 61 attached to an upper portion of a polarizer 12. For example, the protection layer may include a cellulose resin film such as a TAC film; a polyester film such as a PET film; a PC film; a PES film; a polyolefin-based film such as an acryl film or a PE, PP or cyclic olefin resin film; or a resin layer that is cured to form a hard layer, but the present invention is not limited thereto.

In addition, the optical element may further include a phase retardation layer arranged on one surface of the polarizer. The phase retardation layer may be a ¼-wavelength phase retardation layer or a ½-wavelength phase retardation layer. The term "¼- or ½-wavelength phase retardation layer" may refer to a phase retardation element that can phase-retard incident light by ¼ or ½ of a wavelength of the incident light. For example, the optical element having such a structure may be effectively used as an element that is applied to an organic light emitting diode (OLED) to give a light division function and an anti-reflection function. For example, a polymer film which gives birefringence property through an elongation process or a liquid crystal layer formed by polymerizing a polymerizable liquid crystal compound may be used as the phase retardation layer.

Also, the optical element may further include a pressure-sensitive adhesive layer formed on one surface of the polarizer. For example, the pressure-sensitive adhesive layer may be a pressure-sensitive adhesive layer used to attach the optical element to an optical instrument, for example, a liquid crystal panel of a liquid crystal display device or an image display element of a stereoscopic image display device. FIG. 7 is a schematic diagram showing an optical element 7 in which a pressure-sensitive adhesive layer 71 is formed on an upper portion of a polarizer 12.

The pressure-sensitive adhesive layer may have a storage modulus at 25° C. of 0.02 MPa or more, 0.03 MPa or more, 0.04 MPa or more, 0.05 MPa or more, 0.06 MPa or more, 0.07 MPa or more, 0.08 MPa, greater than 0.08 MPa, or 0.09 MPa or more. An upper limit of the storage modulus of the pressure-sensitive adhesive is not particularly limited. For example, the storage modulus may be 0.25 MPa or less, 0.2 MPa or less, 0.16 MPa or less, 0.1 MPa or less, or 0.08 MPa or less.

When the pressure-sensitive adhesive layer has this storage modulus, the optical element may show excellent durability, and thus show a stable light division property since the phase retardation property of the phase retardation layer is, for example, stably maintained for a long period of time under the severe conditions. Also, it is possible to prevent side effects such as light leakage in optical instruments using the optical element. In addition, the optical element may show excellent resistance to an external pressure or scratch due to its improved hardness property, thereby properly maintaining reworkability.

The pressure-sensitive adhesive layer may have a thickness of 25 μm or less, 20 μm or less, or 18 μm or less. When the pressure-sensitive adhesive layer has this thickness, the durability, hardness property and reworkability may be further improved. The pressure-sensitive adhesive layer shows excellent physical properties as the pressure-sensitive adhesive layer becomes thin. Here, a lower limit of the thickness is not particularly limited, but the thickness of the pressure-sensitive adhesive layers may be, for example, adjusted within a range of approximately 1 μm or more, or approximately 5 μM or more in consideration of processability.

The pressure-sensitive adhesive layer may include an acryl pressure-sensitive adhesive, a silicon pressure-sensitive adhesive, an epoxy pressure-sensitive adhesive or a rubber-based pressure-sensitive adhesive.

When the pressure-sensitive adhesive layer includes an acryl pressure-sensitive adhesive, the pressure-sensitive adhesive may be, for example, formed by curing a pressure-sensitive adhesive composition including a thermocurable component, an active energy ray-curable component, or both the thermocurable component and the active energy ray-curable component.

As such, the term "curing" may mean a change in a chemical or physical state of a pressure-sensitive adhesive composition to express a pressure-sensitive adhesive property. As such, the thermocurable component and active energy ray-curable component may also refer to a component whose curing is induced by application of suitable heat or irradiation of active energy rays as described above.

The pressure-sensitive adhesive layer formed of the pressure-sensitive adhesive composition including the thermocurable component may include an acrylic polymer cross-linked using a multifunctional cross-linking agent.

For example, an acrylic polymer having a weight average molecular weight of 500,000 or more may be used as the acrylic polymer cross-linked using the multifunctional cross-linking agent. In this specification, the weight average molecular weight is a value converted from that of a polystyrene standard as measured using GPC. Also, unless otherwise defined in this specification, the term "molecular weight" means a "weight average molecular weight." A polymer having a molecular weight of 500,000 or more may be used to form a pressure-sensitive adhesive layer having excellent durability under severe conditions. An upper limit of the molecular weight is not particularly limited, and the molecular weight of the acrylic polymer may be, for example, adjusted within 2,500,000 or less in consideration of the durability or a coating property of a composition.

According to one exemplary embodiment, the acrylic polymer may include a (meth)acrylic ester monomer and a cross-linking monomer as polymerization units.

For example, alkyl(meth)acrylate may be used as the (meth)acrylic ester-based monomer, and alkyl(meth)acrylate containing an alkyl group having 1 to 20 carbon atoms may be used in consideration of the cohesion, glass transition temperature or pressure-sensitive adhesivity of a pressure-sensitive adhesive. Examples of such a monomer may include methyl (meth)acrylate, ethyl (meth)acrylate, n-propyl(meth)acrylate, isopropyl(meth)acrylate, n-butyl (meth)acrylate, t-butyl (meth)acrylate, sec-butyl (meth)acrylate, pentyl (meth)acrylate, 2-ethylhexyl(meth)acrylate, 2-ethylbutyl (meth)acrylate, n-octyl(meth)acrylate, isooctyl(meth)acrylate, isononyl(meth)acrylate, lauryl(meth)acrylate and tetradecyl(meth)acrylate, which may be used alone or in combination.

In addition, the polymer may further include a cross-linking monomer as a polymerization unit. For example, the polymer may include 80 parts by weight to 99.9 parts by weight of the (meth)acrylic ester monomer and 0.1 parts by weight to 20 parts by weight of the cross-linking monomer as polymerization units. As such, the term "cross-linking monomer" refers to a monomer that can be copolymerized with another monomer used to form an acrylic polymer and provide a cross-linking functional group to the polymer after the copolymerization. The cross-linking functional group may react with a multifunctional cross-linking agent as will be described later to form a cross-linking structure.

Examples of the cross-linking functional group may include a nitrogen-containing functional group such as a hydroxyl group, a carboxyl group, an epoxy group, an isocyanate group or an amino group. Copolymerizable monomers which can provide the above-mentioned cross-linking functional group in manufacture of a pressure-sensitive adhesive resin are widely known in the art. Examples of the cross-linking monomer may include, but are not limited to, a hydroxyl group-containing monomer such as 2-hydroxyethyl (meth)acrylate, 2-hydroxypropyl(meth)acrylate, 4-hydroxybutyl(meth)acrylate, 6-hydroxyhexyl(meth)acrylate, 8-hydroxyoctyl(meth)acrylate, 2-hydroxyethyleneglycol(meth)acrylate or 2-hydroxypropyleneglycol(meth)acrylate; a carboxyl group-containing monomer such as (meth)acrylic acid, 2-(meth)acryloyloxy acetic acid, 3-(meth)acryloyloxy propyl acid, 4-(meth)acryloyloxy butyric acid, an acrylic acid dimer, itaconic acid, maleic acid and maleic anhydride, or a nitrogen-containing monomer such as (meth)acrylamide, N-vinyl pyrrolidinone or N-vinyl caprolactam, which may be used alone or in combination.

The acrylic polymer may include various other monomers as a polymerization unit, when necessary. Examples of the other monomers may include a nitrogen-containing monomer such as (meth)acrylonitrile, (meth)acrylamide, N-methyl (meth)acrylamide or N-butoxy methyl (meth)acrylamide; a styrene-based monomer such as styrene or methyl styrene; glycidyl(meth)acrylate; or a carboxylic acid vinyl ester such as vinyl acetate. Such additional monomers may be adjusted to a content of 20 parts by weight or less, relative to the total weight ratio of the other monomers.

The acrylic polymer may be prepared by subjecting a mixture of monomers obtained by optionally selecting and blending the above-described components through a polymerization method such as solution polymerization, photopolymerization, bulk polymerization, suspension polymerization or emulsion polymerization.

Examples of the multifunctional cross-linking agent serving to cross-link the above-described acrylic polymer in the pressure-sensitive adhesive layer may include conventional thermocurable cross-linking agents such as an isocyanate cross-linking agent, an epoxy cross-linking agent, an aziridine cross-linking agent and a metal chelate cross-linking agent. As such, examples of the isocyanate cross-linking agent may include a multifunctional isocyanate compound such as tolylene diisocyanate, xylene diisocyanate, diphenylmethane diisocyanate, hexamethylene diisocyanate, isoboron diisocyanate, tetramethylxylene diisocyanate or naphthalene diisocyanate, or a compound obtained by reacting the multifunctional isocyanate compound with a polyol compound such as trimethylol propane. Examples of the epoxy cross-linking agent may include at least one selected from the group consisting of ethyleneglycol diglycidyl ether, triglycidyl ether, trimethylolpropane triglycidyl ether, N,N,N',N'-tetraglycidyl ethylenediamine and glycerin diglycidyl ether, examples of the aziridine cross-linking agent may include at least one selected from the group consisting of N,N'-toluene-2,4-bis(1-aziridine-carboxamide), N,N'-diphenylmethane-4,4'-bis(1-aziridine-carboxamide), triethylene melamine, bisisoprotaloyl-1-(2-methylaziridine) and tri-1-aziridinylphosphine oxide, and examples of the metal chelate cross-linking agent may include compounds obtained by coordinating a polyvalent metal such as aluminum, iron, zinc, tin, titanium, antimony, magnesium or vanadium with acetylacetone or ethyl acetoacetate, but the present invention is not limited thereto.

The multifunctional cross-linking agent present in a pressure-sensitive adhesive composition including a thermocurable component or a pressure-sensitive adhesive layer formed of the composition may be, for example, included in an amount of 0.01 parts by weight to 10 parts by weight or 0.01 parts by weight to 5 parts by weight, relative to 100 parts by weight of the acrylic polymer. When a content ratio of the cross-linking agent is adjusted to a content of 0.01 parts by weight or more, it is possible to effectively maintain cohesion of a pressure-sensitive adhesive, whereas, when the content ratio of the cross-linking agent is adjusted to a content of 10 parts by weight or less, it is possible to prevent interlayer detachment or delamination from being caused in the pressure-sensitive adhesive interface and maintain excellent durability. However, the weight ratio may be varied according to desired physical properties such as elastic modulus or inclusion of other cross-linking structures in the pressure-sensitive adhesive layer.

The pressure-sensitive adhesive layer formed of the pressure-sensitive adhesive composition including the active energy ray-curable component may include a cross-linking structure of a polymerized active energy ray-polymerizable compound. The pressure-sensitive adhesive layer may be, for example, formed by blending a compound including at least one functional group which can take part in a polymerization reaction by irradiation of active energy rays, such as, for example, an alkenyl group, an acryloyl group, a methacryloyl group, an acryloyloxy group or a methacryloyloxy group to prepare a pressure-sensitive adhesive composition, and cross-linking and polymerizing the component by irradiating the composition with active energy rays. As such, examples of the compound including the functional group which can take part in the polymerization reaction by irradiation of the active energy rays may include a polymer obtained by introducing a functional group such as an acryloyl group, a methacryloyl group, an acryloyloxy group or a methacryloyloxy group into a side chain of the acrylic polymer; a compound known as an active energy ray-curable oligomer in the art, such as urethane acrylate, epoxy acrylate, polyester acrylate or polyether acrylate; or a multifunctional acrylate as will be described later.

The pressure-sensitive adhesive layer formed of the pressure-sensitive adhesive composition including a thermocurable component and an active energy ray-curable component may have both a cross-linking structure including an acrylic polymer cross-linked using a multifunctional cross-linking agent and a cross-linking structure including a polymerized active energy ray-polymerizable compound.

Such a pressure-sensitive adhesive layer is a pressure-sensitive adhesive including an interpenetrating polymer network (hereinafter referred to as "IPN"). The term "IPN" may refer to a state where at least two cross-linking structures are present in a pressure-sensitive adhesive layer. According to one exemplary embodiment, the cross-linking structures may be present in a state of entanglement, linking or penetration. When the pressure-sensitive adhesive layer includes the IPN, the pressure-sensitive adhesive layer may show excellent durability under the severe conditions, and also may be used to realize an optical element having excellent workability or an excellent ability to prevent light leakage or crosstalk.

The multifunctional cross-linking agent having a cross-linking structure, which is realized by the acrylic polymer cross-linked using the multifunctional cross-linking agent, and the acrylic polymer, for example, the components listed in the items of the pressure-sensitive adhesive composition including the thermocurable component, may be used in the pressure-sensitive adhesive layer including the IPN.

Also, the above-described compounds may be used as the active energy ray-polymerizable compound having the cross-linking structure of the polymerized active energy ray-polymerizable compound.

According to one exemplary embodiment, the active energy ray-polymerizable compound may be a multifunctional acrylate. Compounds having at least two (meth)acryloyl groups may be used as the multifunctional acrylate without limitation. For example, the multifunctional acrylate that may be used herein may include a difunctional acrylate such as 1,4-butanediol di(meth)acrylate, 1,6-hexanediol di(meth)acrylate, neopentylglycol di(meth)acrylate, polyethylene glycol di(meth)acrylate, neopentylglycol adipate di(meth)acrylate, hydroxyl puivalic acid neopentylglycol di(meth)acrylate, dicyclopentanyl di(meth)acrylate, caprolactone-modified dicyclopentenyl di(meth)acrylate, ethyleneoxide-modified di(meth)acrylate, di(meth)acryloxy ethyl isocyanurate, allylated cyclohexyl di(meth)acrylate, tricyclodecanedimethanol(meth)acrylate, dimethylol dicyclopentane di(meth)acrylate, ethyleneoxide-modified hexahydrophthalic di(meth)acrylate, tricyclodecane dimethanol(meth)acrylate, neopentylglycol-modified trimethylpropane di(meth)acrylate, adamantane di(meth)acrylate or 9,9-bis[4-(2-acryloyloxyethoxy)phenyl]fluorene; a trifunctional acrylate such as trimethylolpropane tri(meth)acrylate, dipentaerythritol tri(meth)acrylate, propionic acid-modified dipentaerythritol tri(meth)acrylate, pentaerythritol tri(meth)acrylate, propyleneoxide-modified trimethylolpropane tri(meth)acrylate, trifunctional urethane(meth)acrylate or tris(meth)acryloxyethylisocyanurate; a tetrafunctional acrylate such as diglycerin tetra(meth)acrylate or pentaerythritol tetra(meth)acrylate; a pentafunctional acrylate such as propionic acid-modified dipentaerythritol penta(meth)acrylate; and a hexafunctional acrylate such as dipentaerythritol hexa(meth)acrylate, caprolactone-modified dipentaerythritol hexa(meth)acrylate or urethane(meth)acrylate (for example, a reaction product of an isocyanate monomer and trimethylolpropane tri(meth)acrylate, etc.).

Compounds having a ring structure at the molecule may be used as the multifunctional acrylate. The ring structure included in the multifunctional acrylate may be one of a carbocyclic structure or heterocyclic structure; and a monocyclic or polycyclic structure. Examples of the multifunctional acrylate having a ring structure may include a monomer having an isocyanurate structure, such as tris(meth)acryloxy ethyl isocyanurate, and a hexafunctional acrylate such as isocyanate-modified urethane(meth)acrylate (for example, a reaction product of an isocyanate monomer and trimethylolpropane tri(meth)acrylate, etc.), but the present invention is not limited thereto.

The active energy ray-polymerizable compound having the cross-linking structure formed in the pressure-sensitive adhesive layer including the IPN may be, for example, included in an amount of 5 parts by weight to 40 parts by weight, relative to 100 parts by weight of the acrylic polymer, but the content of the active energy ray-polymerizable compound may be varied when necessary.

In addition to the above-described components, the pressure-sensitive adhesive layer may include various additives known in the art.

For example, the composition including the active energy ray-curable component may further include a photoinitiator to facilitate a polymerization reaction of the components. Also, the pressure-sensitive adhesive layer may further include at least one additive selected from the group consisting of a silane coupling agent, a pressure-sensitive adhesivity-providing resin, an epoxy resin, a curing agent, a UV stabilizer, an antioxidant, a toning agent, a reinforcing agent, a filler, an antifoaming agent, a surfactant and a plasticizer.

The pressure-sensitive adhesive layer may be formed, for example, by coating and curing a pressure-sensitive adhesive composition prepared by blending the above-described components using a tool such as a bar coater or a comma coater. Also, a method of curing a pressure-sensitive adhesive composition is not particularly limited. For example, the pressure-sensitive adhesive composition may be cured through a process of maintaining a composition at an appropriate temperature to perform a cross-linking reaction of the acrylic polymer and the multifunctional cross-linking agent, and a process of irradiating a composition with active energy rays to polymerize the active energy ray-curable compound. When both of the process, of maintaining a composition at an appropriate temperature and the process of irradiating a composition with active energy rays are required to be performed, the processes may be performed sequentially or simultaneously. As such, the irradiation with the active energy rays may be, for example, performed using a high-pressure mercury lamp, an electrodeless lamp or a xenon lamp, and the conditions such as a wavelength or light intensity of the irradiated active energy rays may be selected to properly perform polymerization of the active energy ray-curable compound.

According to one exemplary embodiment, the pressure-sensitive adhesive layer may have a storage modulus at 25° C. of 0.02 MPa or more, 0.05 MPa or more, greater than 0.08 MPa, greater than 0.08 MPa and 0.25 MPa or less, 0.09 MPa to 0.2 MPa, or 0.09 MPa to 0.16 MPa. For example, such a pressure-sensitive adhesive layer may be a pressure-sensitive adhesive layer including the IPN.

According to another exemplary embodiment, the pressure-sensitive adhesive layer may have a storage modulus at 25° C. of 0.02 MPa to 0.08 MPa or 0.04 MPa to 0.08 MPa. Such a pressure-sensitive adhesive may be a pressure-sensitive adhesive layer including a cross-linking structure of the thermocurable component.

In addition, the present invention is directed to providing a method of manufacturing an optical element. The method of manufacturing an optical element according to one exemplary embodiment may include attaching a polarizer to the liquid crystal layer using the adhesive.

As such, the liquid crystal layer may, for example, be prepared by forming an alignment film on a base layer, forming a coating layer of a liquid crystal composition including the polymerizable liquid crystal compound on the alignment film and polymerizing the liquid crystal composition in an aligned state to form a liquid crystal layer.

The alignment film may be, for example, formed using a method of forming a polymer film such as polyimide on a base layer, performing a rubbing process or coating an optically aligned compound, and aligning the optically aligned compound by irradiation with linearly polarized light. Various methods of forming an alignment film are known in the art in consideration of desired alignment patterns, for example, patterns of the first and second regions.

The coating layer of the liquid crystal composition may be formed by coating a composition on the alignment film of the base layer using a known method. A liquid crystal layer may be formed by aligning a liquid crystal composition according to an alignment pattern of the alignment film disposed under the coating layer and then polymerizing the liquid crystal composition.

A method of attaching a liquid crystal layer to a polarizer is not particularly limited. For example, the liquid crystal layer may be attached to the polarizer using a method of coating the above-described adhesive composition on one surface of the liquid crystal layer or the polarizer, and contacting the liquid crystal layer and the polarizer by means of the coating layer and curing the adhesive composition, or a method of contacting the liquid crystal layer and then the polarizer through a dropping method using an adhesive composition and then curing the adhesive composition. As such, the curing of the adhesive composition may be, for example, performed by irradiating the adhesive composition with a proper light intensity of active energy rays in consideration of components in the adhesive composition.

In addition to the above-described operations, the preparation method may further include forming an additional layer such as the protection layer or the ¼-wavelength phase retardation layer. The formation of the additional layer is not particularly limited.

In addition, the present invention is directed to providing a stereoscopic image display device. The stereoscopic image display device according to one exemplary embodiment may include the above-described optical element.

According to one exemplary embodiment, the display device may further include a display element that can generate an image signal for the left eye (hereinafter referred to as an "L signal") and an image signal for the right eye (hereinafter referred to as an "R signal"). The optical element may be arranged so that L and R signals generated on the display element can first penetrate through the polarizer and then enter the liquid crystal layer. According to another exemplary embodiment, the above-described first and second regions having different phase retardation properties are formed on the liquid crystal layer, and may be arranged so that the L signal can penetrate through one of the first and second regions and the R signal can penetrate through the other region. As such, the optical element may be arranged so that the R and L signals can first penetrate through the polarizer of the optical element and then enter each region of the liquid crystal layer when the R and L signals are emitted from the display element.

As long as the stereoscopic image display device includes the optical element as a light-dividing element, a variety of methods known in the art may be applied to manufacture of the stereoscopic image display device.

FIG. 8 is a schematic diagram of a device according to one exemplary embodiment, showing the device obtained when an observer can wear the polarized glasses and observe a stereoscopic image.

For example, the device 8 may sequentially include a light source 81, a polarizing plate 82, the display element 83 and the optical element 84, as shown in FIG. 8.

As such, a direct or edge backlight generally used for liquid crystal display devices (LCDs) may be, for example, used as the light source 81.

According to one exemplary embodiment, the display element 83 may be a transmissive liquid crystal display panel including a plurality of unit pixels which are arranged in a row and/or column direction. One or two or more pixels are combined to form an image signal-generating region for the right eye for generating an R signal (hereinafter referred to as an "RG region") and an image signal-generating region for the left eye for generating an L signal (hereinafter referred to as an "LG region").

The RG and LG regions may be formed in stripe shapes extending in the same direction and alternately arranged adjacent to each other, as shown in FIG. 9, or they may be formed in a lattice pattern and alternately arranged adjacent to each other, as shown in FIG. 10. In the liquid crystal layer 842 of the optical element 84, the first and second regions correspond to the LC and RC regions, respectively, and may be arranged in consideration of the arrangement of the RG and LG regions so that the R signal transmitted from the RG region can be incident to the RC region via the polarizer 841 and the L signal can be incident to the LC region via the polarizer 841.

For example, the display element 83 may be a liquid crystal panel including a first transparent substrate, a pixel electrode, a first alignment film, a liquid crystal layer, a second alignment film, a common electrode, a color filter and a second transparent substrate, which are arranged sequentially toward from the light source 81. The polarizing plate 82 may be attached to one side of the panel through which light is incident, that is, one side of the light source 81, and the optical element 84 may be attached to the other side of the panel, which is arranged opposite to the one side of the panel. A polarizer included in the polarizing plate 82 and a polarizer 841 included in the optical element 84 may be, for example, arranged so that the absorption axes of the two polarizers can be formed at a predetermined angle, for example, at an angle of 90°. Therefore, the arrangement of the two polarizers may allow light emitted from the light source 81 to penetrate through the display element 83 or be intercepted by the display element 83.

In a driving state, unpolarized light may be emitted toward the polarizing plate 82 from the light source 81 of the display device 8. In the light incident to the polarizing plate 82, light having a polarization axis parallel to the light transmission axis of the polarizer of the polarizing plate 82 may penetrate through the polarizing plate 82 and be incident to the display element 83. Light incident to the display element 83 and penetrating through the RG region may be converted into an R signal, light penetrating through the LG region may be converted into an L signal, and the R and L signals may then be incident to the polarizer 841 of the optical element 84.

In the light incident to the liquid crystal layer 842 through the polarizer 841, light penetrating through the LC region and light penetrating through the RC region are emitted, respectively, in a state where the two kinds of light have different polarized states. As described above, the R and L signals having different polarized states may enter the right and left eyes of an observer wearing the polarized glasses, respectively, and thus the observer may observe a stereoscopic image.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which:

FIGS. 2 and 3 are schematic diagrams showing the arrangement of first and second regions of a liquid crystal layer according to one exemplary embodiment.

FIGS. 9 and 10 are schematic diagrams showing the arrangement of RG and LG regions according to one exemplary embodiment.

DETAILED DESCRIPTION OF EXEMPLARY EMBODIMENTS

Figure 1:
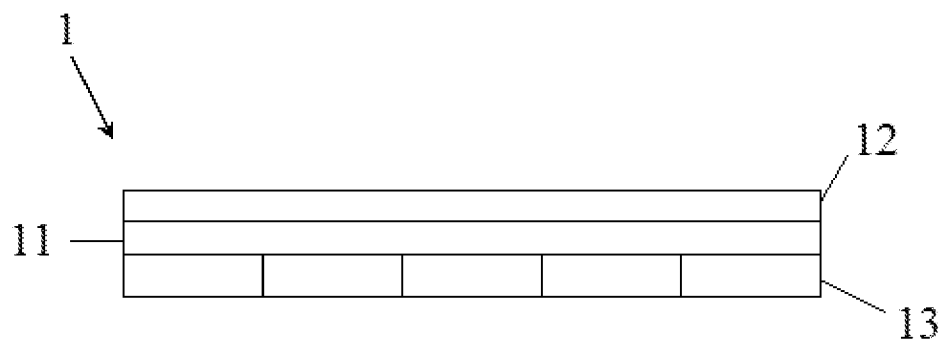
FIG. 1 is a schematic diagram showing an optical element according to one exemplary embodiment of the present invention.
Figure 2:
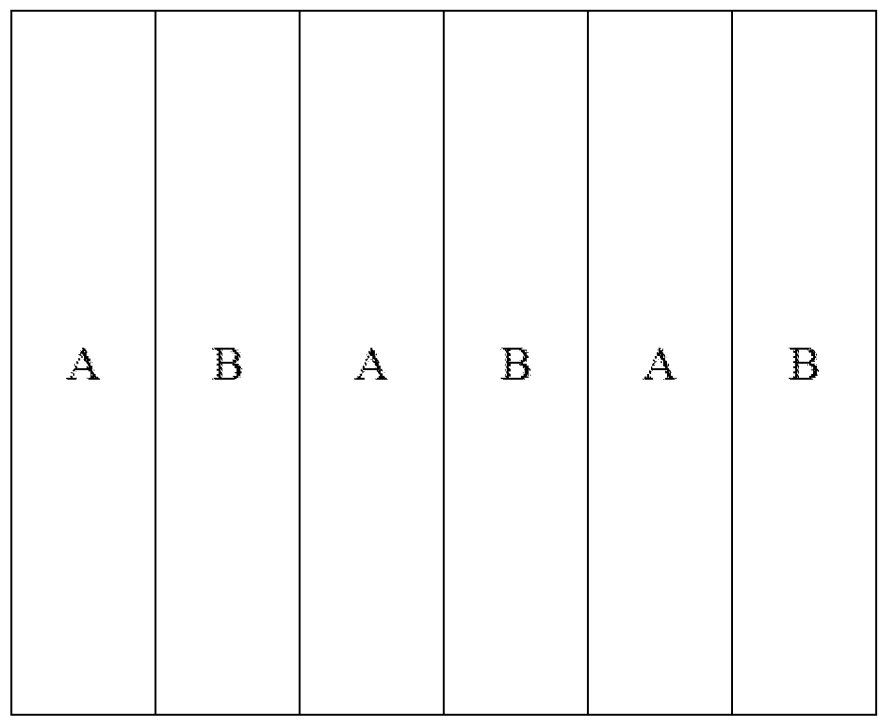
Figure 4:
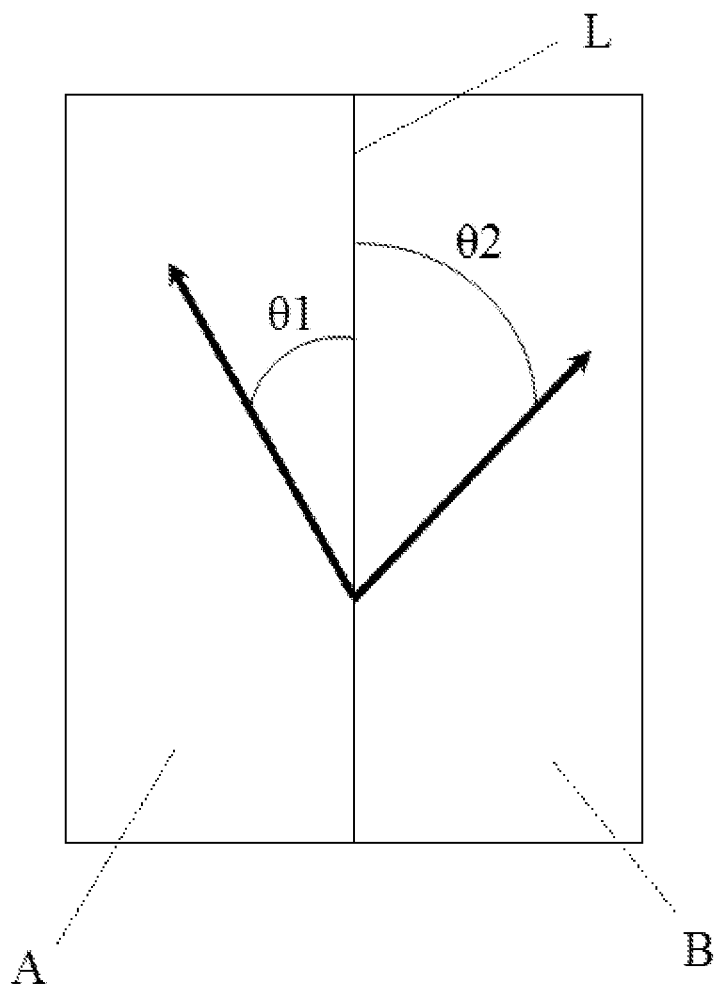
FIG. 4 is a schematic diagram showing the arrangement of optical axes of the first and second regions of the liquid crystal layer according to one exemplary embodiment.
Figure 5:
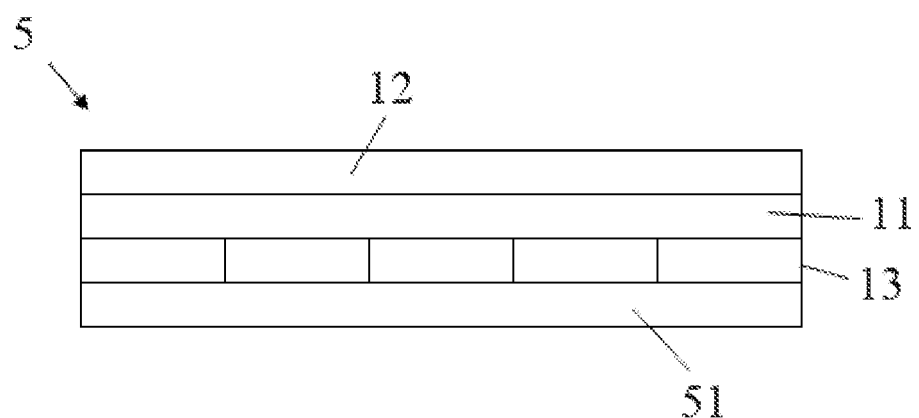
FIGS. 5 to 7 are schematic diagrams showing an optical element according to one exemplary embodiment.
Figure 6:
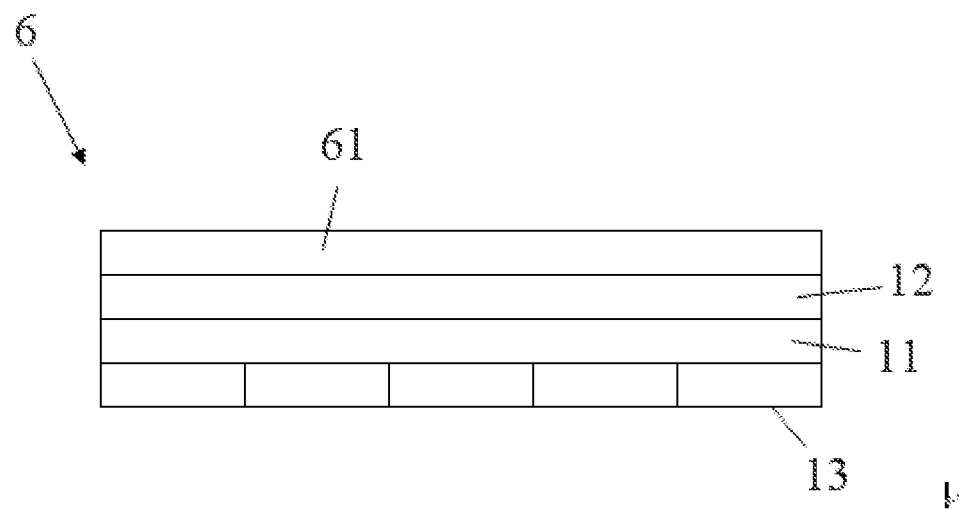
Figure 7:
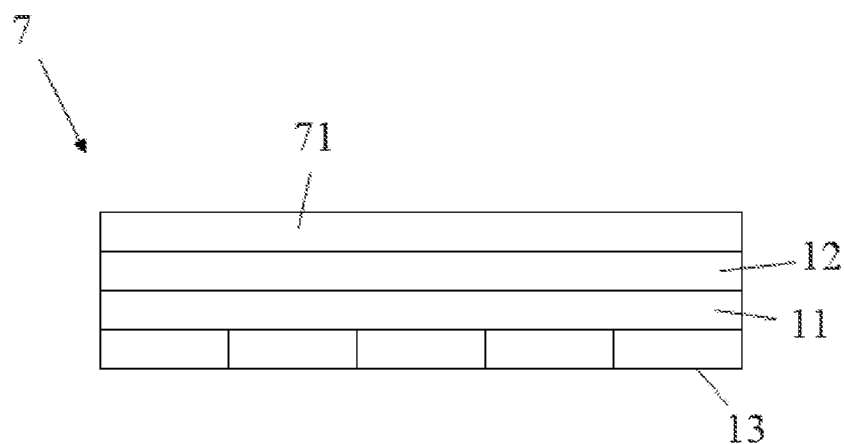
Figure 8:
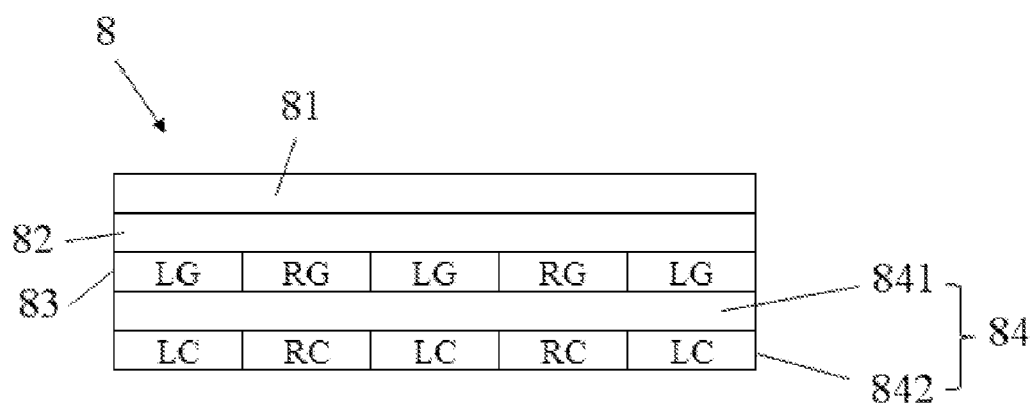
FIG. 8 is a schematic diagram showing a stereoscopic image display device according to one exemplary embodiment.

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

Although the terms first, second, etc. may be used to describe various elements, these elements are not limited by these terms. These terms are only used to distinguish one element from another. For example, a first element could be termed a second element, and, similarly, a second element could be termed a first element, without departing from the scope of exemplary embodiments. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of exemplary embodiments. The singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components and/or groups thereof, but do not preclude the presence or addition of one or more other features, integers, steps, operations, elements, components and/or groups thereof.

With reference to the appended drawings, exemplary embodiments of the present invention will be described in detail below. To aid in understanding the present invention, like numbers refer to like elements throughout the description of the figures, and the description of the same elements will be not reiterated.

The physical properties of optical elements prepared in Examples and

Comparative Examples were evaluated as follows.

1. Evaluation of Adhesive Strength

The optical elements prepared in Examples and Comparative Examples, in which a base layer, an alignment film, a liquid crystal layer, an adhesive layer and a polarizer were sequentially formed, were evaluated for adhesive strength by peeling the polarizer at a peel angle of 90° and a peel rate of 300 m/min to measure a peel strength of the polarizer to the base layer. A peel test was carried out by cutting a prepared optical element into pieces having a width of 20 mm and a length of 100 mm. The evaluation criteria were as follows.

<Evaluation Criteria>

O: A peel strength exceeds 1 N/cm.

X: A peel strength is 1 N/cm or less.

2. Evaluation of Water Resistance

Each of the optical elements prepared in Examples and Comparative Examples was attached to a glass substrate having a width of 8 mm and a length of 5 mm using a pressure-sensitive adhesive layer, and the glass substrate was dipped in water at 60° C. for 24 hours. The glass substrate was taken out of water, and decoloration of the polarizer was observed with the naked eye. In this case, the optical element was evaluated as "O" when no decolored region had a size of less than 10 mm, and evaluated as "X" when a decolored region had a size of 10 mm or more.

3. Evaluation of Thermal Shock Property

Each of the optical elements prepared in Examples and Comparative Examples was cut, and then attached to a glass substrate by means of a pressure-sensitive adhesive layer. Thereafter, one cycle of keeping each optical element at −40° C. for 1 hour and keeping the optical element at 80° C. for 1 hour was repeatedly performed 100 times. A change in appearance of the optical element was observed with the naked eye. In this case, the optical element was evaluated as "O" when there was no change in the appearance of the optical element, and evaluated as "X" when changes such as cracks were observed in the optical element.

4. Evaluation of Durability of Liquid Crystal Layer

The durability of a liquid crystal layer was evaluated by measuring a variation rate of a phase difference value caused after a durability test of the optical elements prepared in Examples and Comparative Examples. More particularly, an optical element was cut into pieces having a size of 10 cm×10 cm (width×length), and then attached to a glass substrate by means of a pressure-sensitive adhesive layer. And the optical element was then kept under a heat-resistant condition of 80° C. for 100 hours or 250 hours. Then, decrement in phase difference values of the liquid crystal layer before and after being kept under the heat-resistant condition was converted into a percentage. The results are listed in the following Tables 4 and 5. As such, the phase difference value was measured at a wavelength of 550 nm according to the manufacturer's manual using Axoscan (commercially available from Axomatrix).

The durability evaluation criteria are as follows.

<Evaluation Criteria>

O: Variations in phase difference values of all the optical elements after being kept under a heat-resistant condition for 100 hours and 250 hours are less than 8%.

X: A variation in phase difference value of any one of the optical elements after being kept under a heat-resistant condition for 100 hours and 250 hours is 8% or more.

5. Crosstalk Evaluation

Figure 9:
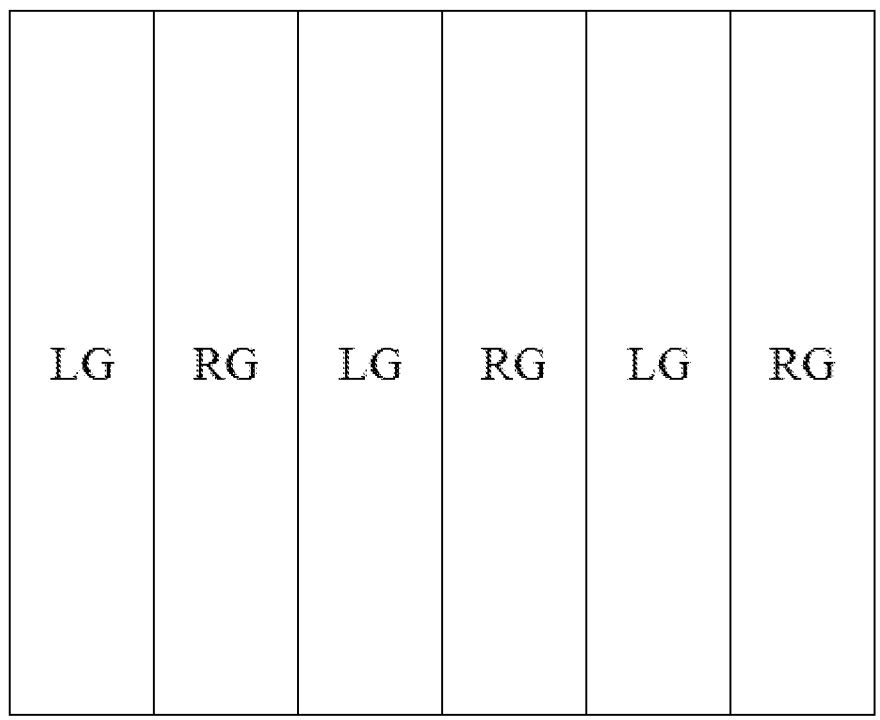

A crosstalk ratio may be defined as a ratio of brightness in a dark state and a bright state when a stereoscopic image is observed. In Examples and Comparative Examples, on the assumption that the optical element is applied to a stereoscopic image display device of a passive glasses type, a crosstalk ratio is measured using the following method. The optical element is used to constitute a stereoscopic image display device as shown in FIG. 9. Therefore, the polarized glasses for observing a stereoscopic image are disposed in a conventional observation point of the stereoscopic image display device. As such, when a stereoscopic image is observed by an observer, the conventional observation point refers to a point which is disposed away from the center of the stereoscopic image display device by a distance corresponding to 3/2 of a length in a horizontal direction of the stereoscopic image display device. At such a point, the polarized glasses are positioned on the assumption that the center of the display device is observed by an observer. As such, when it is assumed that the stereoscopic image is observed by the observer, the length in the horizontal direction of the stereoscopic image display device may be a length in a horizontal direction as viewed from the observer, for example, a width of the image display device. In such an arrangement, a luminometer (equipment name: SR-UL2 Spectrometer) is arranged in rear surfaces of lenses for the left and right eyes in the polarized glasses in a state where the stereoscopic image display device is allowed to output an L signal, and each of the lenses for the left and right eyes is measured for brightness. In this case, the brightness measured in the rear surface of the lens for the left eye is bright-state brightness, and the brightness measured in the rear surface of the lens for the right eye is dark-state brightness. After measurement of each brightness, a ratio of the bright-state brightness to the dark-state brightness ([dark-state brightness]/[bright-state brightness]) is converted into a percentage value (%), which may be defined as a crosstalk ratio (Y). Also, the crosstalk ratio may be measured in the same manner as described above, and the brightness in the bright and dark states may be measured in a state where a stereoscopic image display device outputs an R signal. In this case, the brightness measured in the rear surface of the lens for the left eye is dark-state brightness, and the brightness measured in the rear surface of the lens for the right eye is bright-state brightness. Similarly, a ratio of the dark-state brightness to the bright-state brightness is converted into a percentage value (%), which may be defined as a crosstalk ratio.

6. Evaluation of Phase Difference and Refractive Index

The phase difference and refractive index of an optical element or a liquid crystal layer were evaluated according to the manufacturer's manual using Axoscan (commercially available from Axomatrix).

7. Evaluation of Thickness and Width or Length of Optical Element

The width or length of an optical element was measured using 3-dimensional equipment, Premium 600C and IView Pro program (INTEK IMS Co., Ltd.). Also, the thickness measurement was performed using a spectral reflectometer, which is equipment that is able to evaluate characteristics of a thin film using interference between light reflected on a surface of the thin film and light reflected on an interface disposed under the thin film or phase difference of light.

Preparative Example 1

Preparation of Adhesive Composition (A)

30 parts by weight of 2-hydroxyethyl acrylate, 15 parts by weight of phenoxy ethyl acrylate, 15 parts by weight of isobornyl acrylate, 20 parts by weight of an alicyclic epoxy compound (celloxide C2021P) and 20 parts by weight of 1,4-cyclohexane dimethanol diglycidyl ether were mixed, and 0.5 parts by weight of a radical initiator (CGI 819) and 6 parts by weight of a cationic initiator (diphenyl-(4-phenylthio)phenylsulfonium hexafluorophosphate, CPI100P commercially available from Sanapro) were further blended with the resulting mixture, relative to 100 parts by weight of the solid content of the mixture, to prepare an adhesive composition (A).

Preparative Example 2

Preparation of Adhesive Composition (B)

15 parts by weight of 2-hydroxyethyl acrylate, 7.5 parts by weight of phenoxy ethyl acrylate, 7.5 parts by weight of isobornyl acrylate, 30 parts by weight of an alicyclic epoxy compound (celloxide C2021P), 20 parts by weight of a bisphenol F epoxy resin and 20 parts by weight of vinylcyclohexene monooxide were blended, and 0.5 parts by weight of a radical initiator (CGI 819) and 6 parts by weight of a cationic initiator (diphenyl-(4-phenylthio)phenylsulfonium hexafluorophosphate, CPI100P commercially available from Sanapro) were further blended with the resulting mixture, relative to 100 parts by weight of the solid content of the mixture, to prepare an adhesive composition (B).

Preparative Example 3

Preparation of Adhesive Composition (C)

10 parts by weight of 2-hydroxyethyl acrylate, 5 parts by weight of phenoxy ethyl acrylate, 5 parts by weight of isobornyl acrylate, 30 parts by weight of an alicyclic epoxy compound (celloxide C2021P), 30 parts by weight of a bisphenol F epoxy resin and 20 parts by weight of vinylcyclohexene monooxide were blended, and 0.5 parts by weight of a radical initiator (CGI 819) and 6 parts by weight of a cationic initiator (diphenyl-(4-phenylthio)phenylsulfonium hexafluorophosphate, CPI100P commercially available from Sanapro) were further blended with the resulting mixture, relative to 100 parts by weight of the solid content of the mixture, to prepare an adhesive composition (C).

Preparative Example 4

Preparation of Adhesive Composition (D)

60 parts by weight of 2-hydroxyethyl acrylate, 20 parts by weight of phenoxy ethyl acrylate and 20 parts by weight of isobornyl acrylate were blended, and 5 parts by weight of a radical initiator (CGI 819) was further blended with the resulting mixture, relative to 100 parts by weight of the solid content of the mixture, to prepare an adhesive composition (D).

Preparative Example 5

Preparation of Adhesive Composition (E)

20 parts by weight of phenoxy ethyl acrylate, 20 parts by weight of isobornyl acrylate, 25 parts by weight of an alicyclic epoxy compound (celloxide C2021P) and 25 parts by weight of 1,4-cyclohexane dimethanol diglycidyl ether were mixed, and 3 parts by weight of a radical initiator (CGI 819) and 6 parts by weight of a cationic initiator (diphenyl-(4-phenylthio)phenylsulfonium hexafluorophosphate, CPI100P commercially available from Sanapro) were further blended with the resulting mixture, relative to 100 parts by weight of the solid content of the mixture, to prepare an adhesive composition (E).

Preparative Example 6

Preparation of Liquid Crystal Layer (A)

A composition for forming an optical alignment film was coated on one surface of a TAC base (refractive index: 1.49, thickness: 80,000 nm) so that a thickness after drying could amount to approximately 1,000 Å, and dried at 80° C. for 2 minutes in an oven. As the above-described composition for forming an optical alignment film, a composition was used, which was prepared by mixing a mixture of an acryl monomer and polynorbornene (molecular weight ($M_w$)=150,000) having a cinnamate group of the following Formula 14 with a photoinitiator (Irgacure 907) and then dissolving the mixture in a toluene solvent so that a solid concentration of the polynorbornene could amount to 2% by weight (polynorbornene:acryl monomer:photoinitiator=2:1:0.25 (weight ratio)).

Formula 14

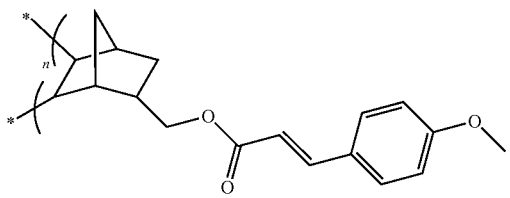

Next, the dried composition for forming an optical alignment film was aligned according to a method disclosed in Korean Patent Application No. 2010-0009723 to form an optical alignment film including first and second alignment regions which are aligned in different directions. More particularly, a pattern mask in which light-transmitting portions and light-intercepting portions in stripe shapes having widths of approximately 450 μm were alternately formed in a vertical direction and a horizontal direction was disposed on an upper portion of the dried composition, and a polarizing plate having two regions formed therein for transmitting two different kinds of polarized light was also disposed on an upper portion of the pattern mask. Then, the alignment treatment performed by irradiating the composition for forming an optical alignment film with UV rays (300 mW/cm$^2$) for approximately 30 seconds by means of the polarizing plate and the pattern mask while transferring the TAC base 30 having the optical alignment film formed thereon at a rate of approximately 3 m/min. Then, a liquid crystal layer was formed on the alignment layer undergoing the alignment treatment. More particularly, a liquid crystal composition including 70 parts by weight of a multifunctional polymerizable liquid crystal compound represented by the following Formula A, 30 parts by weight of a monofunctional polymerizable liquid crystal compound represented by the following Formula B, and a suitable amount of a photoinitiator was coated onto the optical alignment film to a dry thickness of approximately 1 μm, and the liquid crystal composition was aligned according to alignment of the alignment layer arranged under the liquid crystal layer. Then, a liquid crystal layer, which includes first and second regions having different optical axes perpendicular to each other according to the alignment of the optical alignment film arranged under the liquid crystal layer, was formed by cross-linking and polymerizing liquid crystals by irradiating the liquid crystals with UV rays (300 mW/cm$^2$) for approximately 10 seconds. In the liquid crystal layer, a difference between refractive indexes in a slow axis direction and fast axis direction was approximately 0.125.

Preparative Examples 7 to 10

Preparation of Liquid Crystal Layer (B) to Liquid Crystal Layer (E)

Liquid crystal layers were prepared in the same manner as in Preparative Example 7, except that a weight ratio of a multifunctional polymerizable liquid crystal compound and a monofunctional polymerizable liquid crystal compound included in the liquid crystal composition was adjusted as listed in the following Table 1.

TABLE 1

| | Liquid crystal layer (B) | Liquid crystal layer (C) | Liquid crystal layer (D) | Liquid crystal layer (E) |
|---|---|---|---|---|
| Multifunctional polymerizable liquid crystal compound (A) | 55 | 45 | 40 | 10 |
| Monofunctional polymerizable liquid crystal compound (B) | 45 | 55 | 60 | 90 |
| Refractive index difference | 0.125 | 0.125 | 0.125 | 0.125 |
| Thickness (μm) | 1 | 1 | 1 | 1 |

Content unit: parts by weight

Example 1

An optical element was manufactured as follows. First, in a structure prepared in Preparative Example 7, that is, a structure in which a TAC base, an alignment film and a liquid crystal layer (A) were sequentially formed, the liquid crystal layer was attached to the polarizer of the polarizing plate, which included a PVA-based polarizer having a transparent protective film formed on one surface thereof, using an adhesive composition (A). More particularly, a surface of the liquid crystal layer was coated with the adhesive composition to a thickness after curing of 5 μm, and the polarizer was laminated on the liquid crystal layer. Then, an adhesive layer was formed by irradiating UV rays of a UV A wavelength band toward one surface of the transparent protective film (500 mJ/cm$^2$), and the liquid crystal layer was then attached to the polarizer. Thereafter, a conventional acrylic pressure-

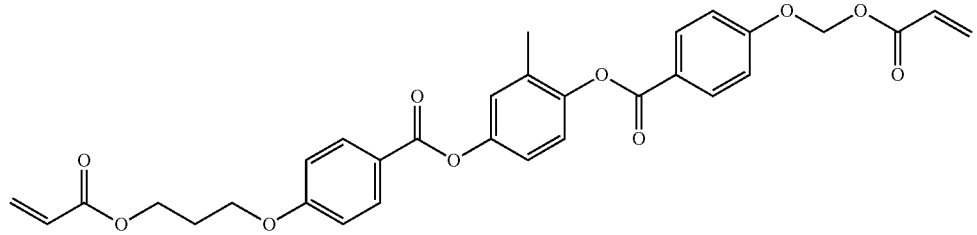

Formula A

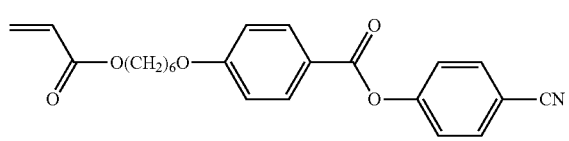

Formula B sensitive adhesive layer was formed on one surface of the transparent protective film of the polarizer to manufacture an optical element.

Examples 2 to 4

Each optical element was manufactured in the same manner as in Example 1, except that liquid crystal layers, the kinds of adhesive compositions and the thickness of an adhesive layer to be formed were changed as listed in the following Table 2, and the UV irradiation conditions were adjusted to sufficiently cure the adhesive compositions.

TABLE 2

|  |  | Liquid crystal layers | Kinds of adhesive compositions | Adhesive layer thickness (μm) |
|---|---|---|---|---|
| Examples | 2 | Liquid crystal layer (A) | Adhesive composition (B) | 5 |
|  | 3 | Liquid crystal layer (A) | Adhesive composition (C) | 5 |
|  | 4 | Liquid crystal layer (B) | Adhesive composition (A) | 5 |

Comparative Examples 1 to 9

Optical elements were manufactured in the same manner as in Example 1, except that liquid crystal layers, the kinds of adhesive compositions and the thickness of an adhesive layer to be formed were changed as listed in the following Table 3, and the UV irradiation conditions were adjusted to sufficiently cure the adhesive compositions.

TABLE 3

|  |  | Liquid crystal layers | Kinds of adhesive compositions | Adhesive layer thickness (μm) |
|---|---|---|---|---|
| Comparative Examples | 1 | Liquid crystal layer (D) | Adhesive composition (A) | 5 |
|  | 2 | Liquid crystal layer (D) | Adhesive composition (B) | 5 |
|  | 3 | Liquid crystal layer (D) | Adhesive composition (C) | 5 |
|  | 4 | Liquid crystal layer (E) | Adhesive composition (A) | 5 |
|  | 5 | Liquid crystal layer (E) | Adhesive composition (B) | 5 |
|  | 6 | Liquid crystal layer (E) | Adhesive composition (C) | 5 |
|  | 7 | Liquid crystal layer (A) | Adhesive composition (D) | 5 |
|  | 8 | Liquid crystal layer (A) | Adhesive composition (E) | 5 |
|  | 9 | Liquid crystal layer (C) | Adhesive composition (A) | 5 |

The optical elements prepared in Examples and Comparative Examples were evaluated for physical properties using the above-described method. The evaluation results are listed in the following Tables 4 and 5, respectively.

TABLE 4

|  |  | Water resistance | Adhesive strength | Thermal shock property | Durability of liquid crystal layers | Initial phase difference (nm) | Changes in phase difference (after being kept for 100 hours) | |
|---|---|---|---|---|---|---|---|---|
|  |  |  |  |  |  |  | Phase difference (nm) after being kept at heating conditions | Changes (%) |
| Examples | 1 | ○ | ○ | ○ | ○ | 125.4 | 119.7 | 4.5 |
|  | 2 | ○ | ○ | ○ | ○ | 125.4 | 119.7 | 4.5 |
|  | 3 | ○ | ○ | ○ | ○ | 125.4 | 119.7 | 4.5 |
|  | 4 | ○ | ○ | ○ | ○ | 120.7 | 114.1 | 5.5 |

TABLE 5

|  |  | Water resistance | Adhesive strength | Thermal shock property | Durability of liquid crystal layers | Initial phase difference (nm) | Changes in phase difference (after being kept for 100 hours) | |
|---|---|---|---|---|---|---|---|---|
|  |  |  |  |  |  |  | Phase difference (nm) after being kept at heating conditions | Changes (%) |
| Comparative Example | 1 | ○ | X | ○ | X | 77.2 | 69.4 | 10.1 |
|  | 2 | ○ | X | ○ | X | 77.2 | 69.4 | 10.1 |
|  | 3 | ○ | X | ○ | X | 77.2 | 69.4 | 10.1 |
|  | 4 | ○ | X | ○ | X | — | — | — |
|  | 5 | ○ | X | ○ | X | — | — | — |
|  | 6 | ○ | X | ○ | X | — | — | — |
|  | 7 | X | X | ○ | ○ | 125.4 | 119.7 | 4.5 |
|  | 8 | ○ | X | ○ | ○ | 125.4 | 119.7 | 4.5 |
|  | 9 | ○ | X | ○ | X | 94.1 | 85.5 | 9.1 |

—: A phase difference value cannot be measured since a liquid crystal layer is in a non-aligned state.

Experimental Example 1

Evaluation of Refractive Index Relationship of Liquid Crystal Layer and Light Division Property According to Thickness In order to evaluate the refractive index relationship of a liquid crystal layer and a light division property of the liquid crystal layer according to a thickness, a sample was prepared, as will be described later. More particularly, a phase retardation layer was formed in the same manner as in Preparative Example 6, wherein the phase retardation layer was prepared by forming liquid crystal layers having thicknesses of approximately 0.3 μm, 1 μm and 2.5 μm, respectively, by adjusting compositions of a liquid crystal mixture so that a difference between refractive indexes in a slow axis direction and a fast axis direction could amount to 0.03 after forming of the liquid crystal layer. Also, a phase retardation layer was prepared in the same manner using the same liquid crystal compound as in Preparative Example 6, wherein the phase retardation layer was prepared by forming liquid crystal layers having thicknesses of approximately 0.3 μm and 2.5 μm. Also, a phase retardation layer was formed in the same manner as in Preparative Example 6, wherein the phase retardation layer was prepared by forming liquid crystal layers having thicknesses of approximately 0.3 μm, 1 μm and 2.5 μm, respectively, by adjusting compositions of a liquid crystal mixture so that a difference between refractive indexes in a slow axis direction and a fast axis direction could amount to 0.22 after forming of the liquid crystal layer. Thereafter, an optical element was prepared in the same manner as in Example 1 using the prepared phase retardation layer, and crosstalk ratios obtained when the prepared optical element and the optical element of Example 1 were used to observe a stereoscopic image were evaluated. The results are listed in the following Table 6.

TABLE 6

| Liquid crystal layers of phase retardation layers | | |
|---|---|---|
| Refractive index difference* | Thickness (μm) | Crosstalk ratio (%) |
| 0.03 | 0.3 | 79.5 |
| 0.03 | 1 | 45.3 |
| 0.03 | 2.5 | 10.3 |
| 0.125 | 0.3 | 36 |
| 0.125 | 1 | 0.5 |
| 0.125 | 2.5 | 177.4 |
| 0.22 | 0.3 | 14.6 |
| 0.22 | 1 | 30.7 |
| 0.22 | 2.5 | 121.6 |

Refractive index difference represents a difference between in-plane refractive indexes of a liquid crystal layer in a slow axis direction and fast axis direction.

The optical element according to one exemplary embodiment of the present invention may be a light-dividing element, for example, an element that can divide incident light into at least two kinds of light having different polarized states. For example, the optical element may be used to realize a stereoscopic image.

While the invention has been shown and described with reference to certain exemplary embodiments thereof, it will be understood by those skilled in the art that various changes in form and details may be made therein without departing from the scope of the invention as defined by the appended claims.

What is claimed is:

1. An optical element comprising a polarizer and a liquid crystal layer which are attached to each other by means of an adhesive layer including an active energy ray-curable adhesive composition in a cured state, the adhesive composition including a radically polymerizable compound containing a hydroxyl group and a cationically polymerizable compound, the liquid crystal layer having a difference between in-plane refractive index in a slow axis direction and in-plane refractive index in a fast axis direction of 0.05 to 0.2 and a thickness of 0.5 μm to 2.0 μm, and satisfies the following Equation 1:

$$X < 8\% \quad \text{Equation 1}$$

wherein X represents a percentage of a variation in a phase difference value of the liquid crystal layer obtained after keeping the optical element at 80° C. for 100 hours, relative to the initial phase difference value of the liquid crystal layer of the optical element.

2. The optical element of claim 1, wherein the radically polymerizable compound containing a hydroxyl group is a compound represented by the following Formula 1:

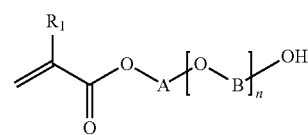

Formula 1 wherein $R_1$ represents hydrogen or an alkyl group, A and B independently represent an alkylene group or an alkylidene group, respectively, and n is an integer ranging from 0 to 5.

3. The optical element of claim 1, wherein the cationically polymerizable compound is at least one epoxy compound selected from the group consisting of an alicyclic epoxy compound, an aromatic epoxy compound and an aliphatic epoxy compound.

4. The optical element of claim 1, wherein the cationically polymerizable compound is a cresol novolac-type epoxy resin or a phenol novolac-type epoxy resin.

5. The optical element of claim 4, wherein the epoxy resin has a weight average molecular weight of 1,000 to 5,000.

6. The optical element of claim 1, wherein the adhesive composition comprises 10 parts by weight to 30 parts by weight of the radically polymerizable compound containing a hydroxyl group and 30 parts by weight to 90 parts by weight of the cationically polymerizable compound.

7. The optical element of claim 1, wherein the adhesive composition further comprises a compound represented by the following Formula 12:

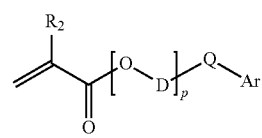

Formula 12 wherein $R_2$ represents hydrogen or an alkyl group, D represents an alkylene group or an alkylidene group, Q represents a single bond, an oxygen atom or a sulfur atom, Ar represents an aryl group, and p is an integer ranging from 0 to 3.

8. The optical element of claim 1, wherein the adhesive composition further comprises a compound represented by the following Formula 13:

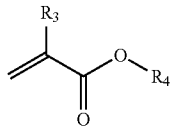

Formula 13 wherein $R_3$ represents hydrogen or an alkyl group, and $R_4$ represents a monovalent alicyclic hydrocarbon group.

9. The optical element of claim 1, wherein the adhesive composition further comprises a cationic initiator.

10. The optical element of claim 1, wherein the adhesive composition further comprises a radical initiator.

11. The optical element of claim 1, wherein the liquid crystal layer comprises a multifunctional polymerizable liquid crystal compound and a monofunctional polymerizable liquid crystal compound in a polymerized form.

12. The optical element of claim 11, wherein the polymerizable liquid crystal compound is a compound represented by the following Formula 15:

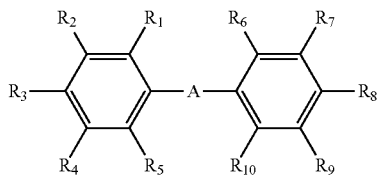

Formula 15 wherein A is a single bond, —COO— or —OCO—, and $R_1$ to $R_{10}$ are independently hydrogen, a halogen, an alkyl group, an alkoxy group, an alkoxycarbonyl group, a cyano group, a nitro group, —O-Q-P or a substituent of the following Formula 16, respectively, provided that at least one of the substituents $R_1$ to $R_{10}$ is —O-Q-P or a substituent of the following Formula 16, or two adjacent substituents of $R_1$ to $R_5$ or two adjacent substituents of $R_6$ to $R_{10}$ are joined together to form a benzene ring substituted with —O-Q-P, wherein Q is an alkylene group or an alkylidene group, and P is a polymerizable functional group,

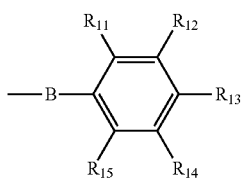

Formula 16 wherein the "—" indicated on the left side of B means that B directly binds to the benzene ring of Formula 15, B is a single bond, —COO— or —OCO—, and $R_{11}$ to $R_{15}$ are independently hydrogen, a halogen, an alkyl group, an alkoxy group, an alkoxycarbonyl group, a cyano group, a nitro group or —O-Q-P, respectively, provided that at least one of substituents $R_{11}$ to $R_{15}$ is —O-Q-P, or two adjacent substituents of $R_{11}$ to $R_{15}$ are joined together to form a benzene ring substituted with —O-Q-P, wherein Q is an alkylene group or an alkylidene group, and P is an alkenyl group, an epoxy group, a cyano group, a carboxyl group, an acryloyl group, a methacryloyl group, an acryloyloxy group or a methacryloyloxy group.

13. The optical element of claim 11, wherein the liquid crystal layer comprises greater than 0 parts by weight and 100 parts by weight or less of the monofunctional polymerizable liquid crystal compound, relative to 100 parts by weight of the multifunctional polymerizable liquid crystal compound.

14. The optical element of claim 1, wherein the liquid crystal layer comprises first region and second region having different phase retardation properties.

15. The optical element of claim 14, wherein the first region and second region have optical axes formed in different directions.

16. The optical element of claim 15, wherein a line bisecting an angle formed between the optical axes of the first region and the optical axes second region is formed vertically or horizontally with respect to the absorption axis of the polarizer.

17. The optical element of claim 1, further comprising:
a pressure-sensitive adhesive layer formed on one surface of the polarizer, having a storage modulus at 25° C. of 0.02 MPa to 0.08 MPa and having a cross-linking structure of an acrylic polymer cross-linked by means of a multifunctional cross-linking agent.

18. The optical element of claim 1, further comprising:
a pressure-sensitive adhesive layer formed on one surface of the polarizer, having a storage modulus at 25° C. of greater than 0.08 MPa, and having both a cross-linking structure including an acrylic polymer cross-linked using a multifunctional cross-linking agent and a cross-linking structure including a polymerized active energy ray-polymerizable compound.

19. A stereoscopic image display device comprising an optical element defined in claim 1.

20. The stereoscopic image display device of claim 19, further comprising a display element configured to generate image signals for left and right eyes,
wherein the liquid crystal layer of the optical element comprises first region and second region having different phase retardation properties, and
the optical element is arranged so that the image signal for the left eye can pass through one of the first region and second region and the image signal for the right eye can pass through the other region.

* * * * *